United States Patent
Delmotte et al.

(10) Patent No.: US 11,270,808 B2
(45) Date of Patent: Mar. 8, 2022

(54) SPECTRAL SELECTION COMPONENT FOR XUV RADIATION

(71) Applicant: CENTRE NATIONAL DE LA RECHERCHE SCIENTIFIQUE, Paris (FR)

(72) Inventors: Franck Delmotte, Bures sur Yvette (FR); Maël Dehlinger, Orsay (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 228 days.

(21) Appl. No.: 16/461,360

(22) PCT Filed: Nov. 27, 2017

(86) PCT No.: PCT/EP2017/080549
§ 371 (c)(1),
(2) Date: May 15, 2019

(87) PCT Pub. No.: WO2018/099866
PCT Pub. Date: Jun. 7, 2018

(65) Prior Publication Data
US 2019/0287692 A1    Sep. 19, 2019

(30) Foreign Application Priority Data

Nov. 29, 2016 (FR) ..................... 1661636

(51) Int. Cl.
*G02B 5/08* (2006.01)
*G02B 5/28* (2006.01)
(Continued)

(52) U.S. Cl.
CPC ........... *G21K 1/062* (2013.01); *G02B 5/0891* (2013.01); *G02B 5/26* (2013.01)

(58) Field of Classification Search
CPC ...... G02B 5/08; G02B 5/0816; G02B 5/0883; G02B 5/0891; G02B 5/26; G21K 1/062
(Continued)

(56) References Cited

U.S. PATENT DOCUMENTS 4,969,175 A * 11/1990 Nelson ................... B82Y 10/00
378/146
5,173,930 A    12/1992 Hoover
(Continued)

FOREIGN PATENT DOCUMENTS

JP    62-226047 A    10/1987
JP    3-152426 A    6/1991
(Continued)

OTHER PUBLICATIONS

Poletto, et al., "Time-compensated extreme-UV and soft x-ray monochromator for ultrashort high-order harmonic pulses", Journal of Optics A: Pure and Applied Optics, vol. 3, No. 5, pp. 374-379, Sep. 1, 2001.
(Continued)

*Primary Examiner* — Thong Q Nguyen
(74) *Attorney, Agent, or Firm* — BakerHostetler

(57) ABSTRACT

A spectral selection component for XUV radiation comprises a first multilayer mirror for receiving an XUV radiation beam along an input axis located in a first plane of incidence. The spectral selection component comprises a second multilayer mirror for receiving, in a second plane of incidence, an XUV radiation beam reflected by the first mirror in order to transmit the radiation to an output axis of the spectral selection component. One of the first and second mirrors has a first, high-pass energy spectral response, with a flank on the low-energy side with a steepness that is greater than 0.1 eV−1, whereas the other mirror has a second, low-pass energy spectral response, with a flank on the
(Continued)

high-energy side with a steepness that is greater than 0.1 eV−1. The first and second mirrors may have an only partial overlap in their spectral energy responses.

12 Claims, 15 Drawing Sheets

(51) Int. Cl.
*G21K 1/06* (2006.01)
*G02B 5/26* (2006.01)

(58) Field of Classification Search
USPC ......... 359/359, 361, 584–587, 850, 856–860
See application file for complete search history.

(56) References Cited

U.S. PATENT DOCUMENTS

| | | | | |
|---|---|---|---|---|
| 5,958,605 | A * | 9/1999 | Montcalm | G02B 1/14 428/627 |
| 6,504,900 | B2 * | 1/2003 | Kondo | G01N 23/20 378/34 |
| 6,724,465 | B2 * | 4/2004 | Babonneau | G03F 7/702 355/67 |
| 7,430,277 | B2 * | 9/2008 | Hoghoj | B82Y 10/00 378/145 |
| 2004/0062349 | A1 | 4/2004 | Schuster | |
| 2006/0245057 | A1 * | 11/2006 | Van Herpen | G02B 5/0891 359/587 |
| 2009/0009858 | A1 * | 1/2009 | Feigl | G21K 1/062 359/359 |
| 2010/0277804 | A1 | 11/2010 | Galvanauskas et al. | |

FOREIGN PATENT DOCUMENTS

| | | |
|---|---|---|
| JP | 6-174897 A | 6/1994 |
| JP | 2001-272358 A | 10/2001 |

OTHER PUBLICATIONS

Grigonis, et al., "C/Si multilayer mirrors for the 25-30-nm wavelength region", Applied Optics, vol. 36, Issue 13, pp. 2839-2842, (1997).

Villoresi, "Compensation of optical path lengths in extreme-ultraviolet and soft-x-ray monochromators for ultrafast pulses", Applied Optics, vol. 38, Issue 28, pp. 6040-6049, 1999.

Feigl, et al., "EUV multilayer optics", Microelectronic Engineering, vol. 83, Issues 4-9, pp. 703-706, Apr.-Sep. 2006.

Gullikson, et al., "Molybdenum/silicon multilayer components for high harmonic generation sources", Applied Optics, vol. 54, Issue 13, pp. 4280-4284, (2015).

Andre, et al., "MONOX: a characterization tool for the X-UV range", The European Physical Journal—Applied Physics, vol. 31, Issue 2, pp. 147-152, Aug. 2005.

Hara, et al.,"Narrow-bandpass multilayer mirrors for an extreme-ultraviolet Doppler telescope", Applied Optics, vol. 38, Issue 31, pp. 6617-6627, (1999).

Ravet, et al., "B/Si multilayers for soft x-ray and extreme ultraviolet optics", Journal of Applied Physics, vol. 89, Issue 2, pp. 1145-1150, (2001).

Windt, et al., "Experimental comparison of extreme-ultraviolet multilayers for solar physics", Applied Optics, vol. 43, Issue 9, pp. 1835-1848, (2004).

English translation of Notice of Rejection issued in Japanese Patent Application No. 2019-528661 dated Oct. 26, 2021.

* cited by examiner

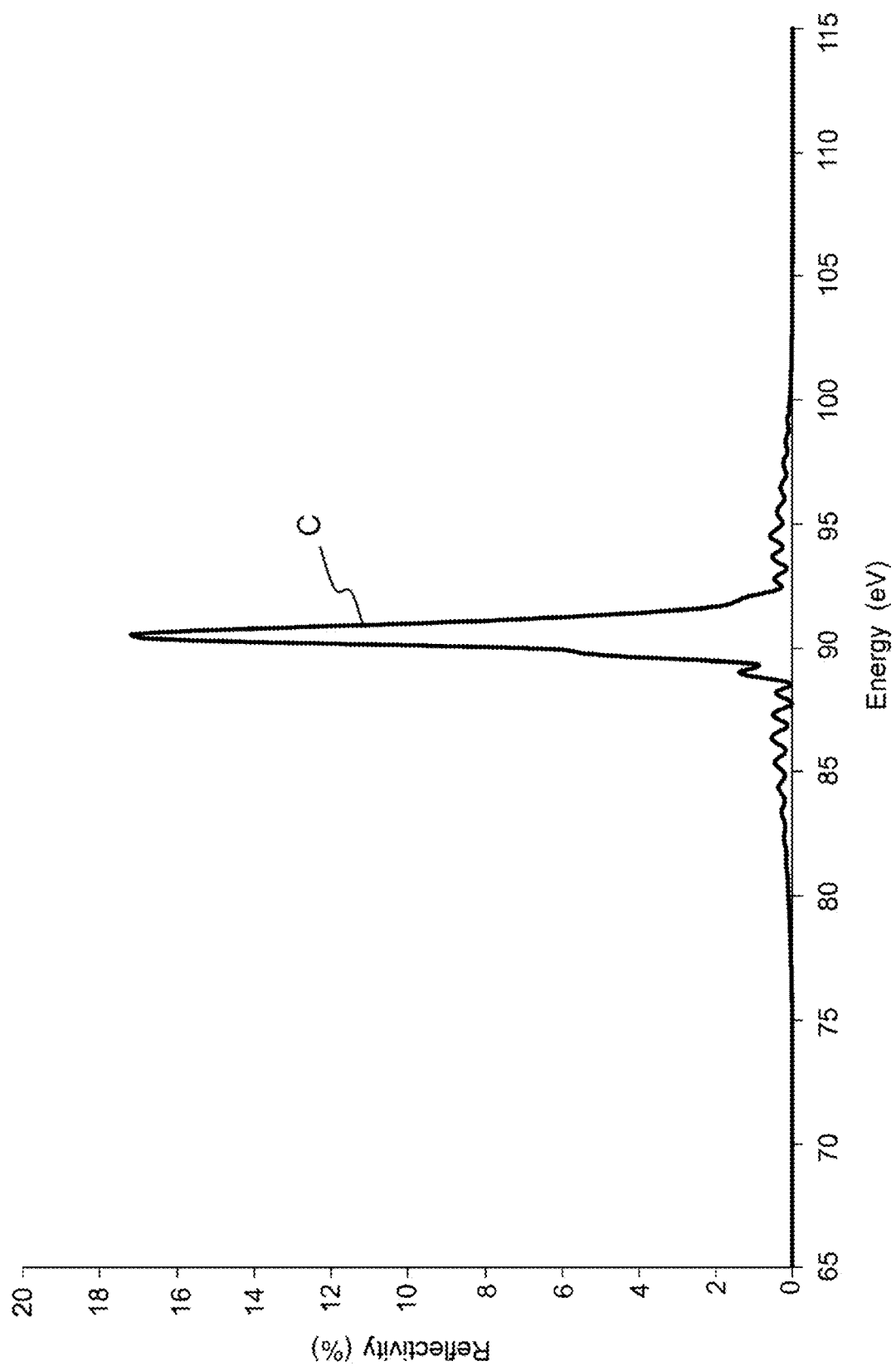

SPECTRAL SELECTION COMPONENT FOR XUV RADIATION

CROSS-REFERENCE TO RELATED APPLICATIONS

This application is a National Stage of International patent application PCT/EP2017/080549, filed on Nov. 27, 2017, which claims priority to foreign French patent application No. FR 1661636, filed on Nov. 29, 2016, the disclosures of which are incorporated by reference in their entirety.

FIELD OF THE INVENTION

The present description relates to a spectral selection component for XUV radiation, to a system for emitting an XUV radiation beam fitted with such a component and to a spectral selection method for XUV radiation.

BACKGROUND

The study of ultrafast dynamics on femtosecond (fs) or attosecond (as) timescales in atoms and molecules is a fast-growing area of research of relevance to dilute matter, condensed matter and plasmas. These studies require the matter being studied to be subjected to an ultrashort and intense laser field. In particular, the investigation of matter using coherent pulses in the XUV (or EUV, for "extreme UV") domain, typically comprising radiation with an energy of between 12 eV and 400 eV (i.e. wavelengths of between 3 nm and 100 nm) is growing at an especially fast pace. Specifically, phase-shaped XUV pulses allow matter to be stimulated with attosecond (as) (1 as=10-18 s) temporal resolution; XUV pulses of longer (typically ps) pulse duration may provide access to electron structures with an energy resolution of less than one meV, allowing detailed information on electron-nucleus interactions to be obtained.

Among XUV pulsed sources, high harmonic generation (HHG) sources are known, the emission principle of which is based on the interaction of an intense infrared (IR) laser with atoms or molecules. XUV coherent pulses in the fs-to-as range are obtained via the generation of high harmonics of the incident fundamental radiation in a non-linear process. HHG sources have now reached technological maturity and are particularly suitable for carrying out ultrafast dynamics studies on the laboratory scale. Plasma XUV lasers are also known, these being based on the incoherent emission of XUV radiation by a plasma formed using an fs or ps laser. Lastly, there are free-electron lasers, the emission principle of which is based on the interaction of a high-energy electron beam with a periodic magnetic field, allowing the generation of ultrashort (fs) coherent XUV pulses.

In parallel with XUV sources, optical components and detectors for characterizing and controlling the pulses have been developed. In particular, spectral selection components, or monochromators, allow a wavelength of interest to be selected.

Diffraction gratings make it possible to produce monochromators exhibiting very high spectral resolution. However, regarding applications in the field of ultrashort pulses, it is necessary for a pulse to be transmitted without its duration being altered, which amounts to being able to transmit the pulse with a certain spectral extent. In the extreme UV, this corresponds to a bandwidth of the order of one to a few electron volts. Now, it is known that a diffraction grating, due to the diffraction effect itself, inevitably causes the pulse to be temporally widened. As described in L. Poletto et al. ("Time-compensated extreme-UV and soft x-ray monochromator for ultrashort high-order harmonic pulses", J. Opt. A: Pure Appl. Opt. 3 (201) 374-379), it is possible to compensate for the temporal dispersion in a configuration with two diffraction gratings operating at grazing incidence. However, the component thus formed is very sensitive to misalignment, aberration and surface fault problems. Furthermore, the compensation for temporal dispersion for a given angle is optimal in a very narrow spectral region, which means it is necessary to change the output direction of the monochromator when it is desired to compensate for dispersion over a wider spectral range.

In the article by L. Poletto cited above, the use of two multilayer mirrors is recommended as an alternative to diffraction gratings.

Multilayer mirrors are known to exhibit high reflectance in the XUV domain. The physics of multilayer mirrors is well known and is described in a number of scientific publications (see for example E. Spiller, "Soft X-Rays Optics", SPIE Optical Engineering Press, Bellingham (1994)). Multilayer mirrors may be used at normal incidence or at oblique incidence. They are composed of a coating made of an alternation of nanometer-thick layers of materials with a high contrast in refractive indices; typically, they consist of an alternation of materials with high and low atomic numbers. Determining the choice of materials and thicknesses of the layers makes it possible to define the optical properties of the mirror (wavelength/energy of highest reflectance, bandwidth, shape of the reflectance spectral response). Furthermore, since the reflectance spectral response is dependent on the angle of incidence, it is possible, by rotating the mirrors, to choose which wavelength (or energy) is reflected by each of the mirrors and hence emitted at the output of the monochromator.

The monochromator proposed by L. Poletto thus comprises two identical multilayer mirrors working in parallel-beam mode and being capable of rotating about a vertical axis that is parallel to the plane of the mirror while remaining parallel to one another so as to keep the direction of the output beam constant. In comparison with the technology based on diffraction gratings, the monochromator thus described allows a constant output direction to be maintained in the spectral region of interest. It is also more compact and compensates for temporal dispersion better.

However, multilayer mirrors have a reflectance that is optimized for a given angle of incidence and when the angle of incidence is changed to vary the energy, this results in a widening of the (energy) spectral band, defined as the full width at half maximum of the reflectance spectral response.

The present description proposes a monochromator exhibiting a particular arrangement of two multilayer mirrors, allowing both the output direction and the full width at half maximum of the reflectance spectral response to be maintained when the angle of incidence on the mirrors is modified.

SUMMARY OF THE INVENTION

Systems and methods of the present invention relate to a spectral selection component for XUV radiation. Embodiments of the present invention may comprise a first multilayer mirror for receiving an XUV radiation beam along an input axis located in a first given plane of incidence and comprising a first axis of rotation that is substantially perpendicular to the first plane of incidence. Embodiments of the present invention may comprise a second multilayer mirror for receiving, in a second plane of incidence, an XUV radiation beam reflected by the first mirror in order to transmit it to an output axis of the spectral selection component, and comprising a second axis of rotation that is substantially perpendicular to the second plane of incidence One of the first and second mirrors may have a first, high-pass energy spectral response, with a flank on the low-energy side with a steepness that is greater than 0.1 eV−1. The other of the first and second multilayer mirrors may have a second, low-pass energy spectral response, with a flank on the high-energy side with a steepness that is greater than 0.1 eV−1. The first and second multilayer mirrors may have an only partial overlap in their spectral energy responses.

BRIEF DESCRIPTION OF THE DRAWINGS

Other advantages and features of the technical solution presented above will become apparent on reading the detailed description provided below with reference to the figures, in which:

FIG. 2C illustrates the energy spectral response curve of the reflectance of a component combining the high-pass and low-pass mirrors, the responses of which are shown in FIG. 2B;

DETAILED DESCRIPTION

Figure 1A:
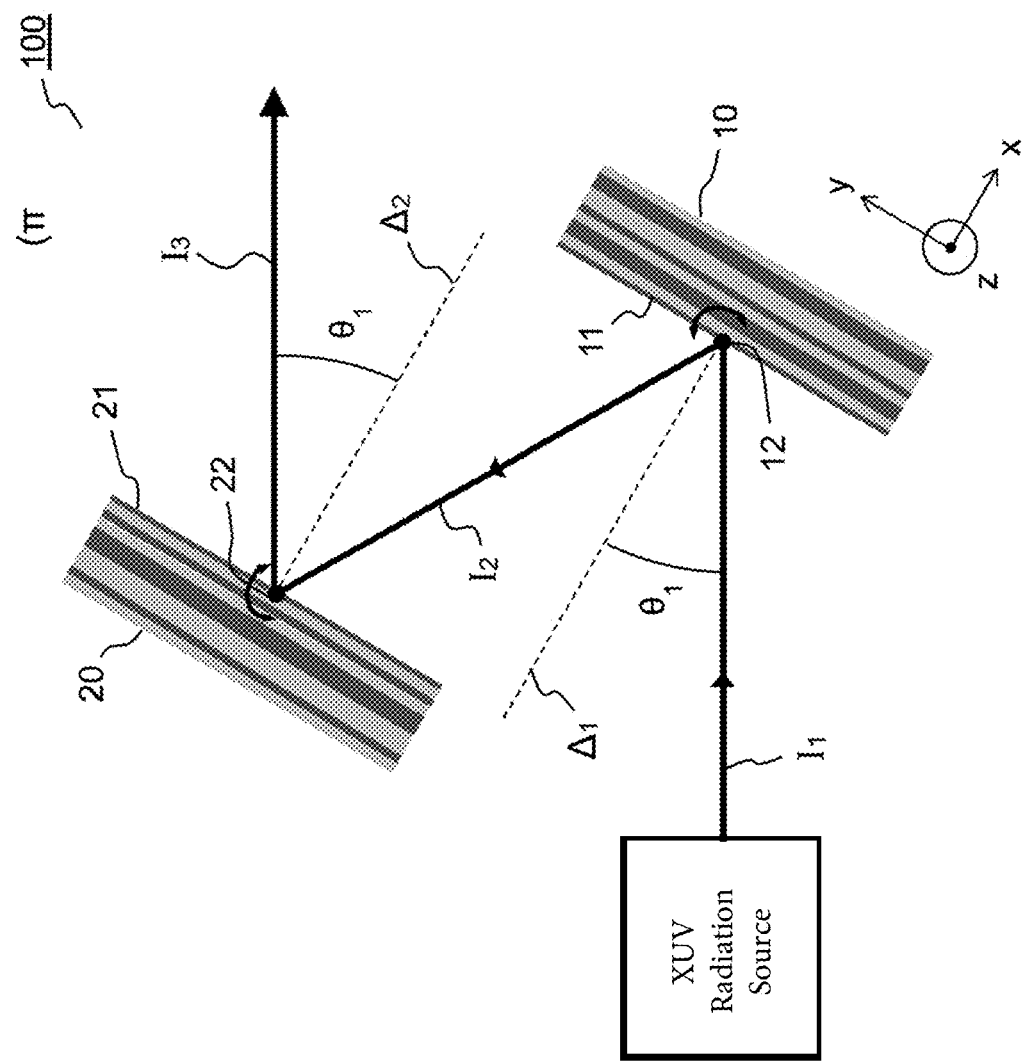
FIG. 1A schematically shows a spectral selection component according to one exemplary embodiment of the present description, receiving an XUV radiation beam along an input axis forming, with the first mirror, a first angle of incidence.
Figure 1A:
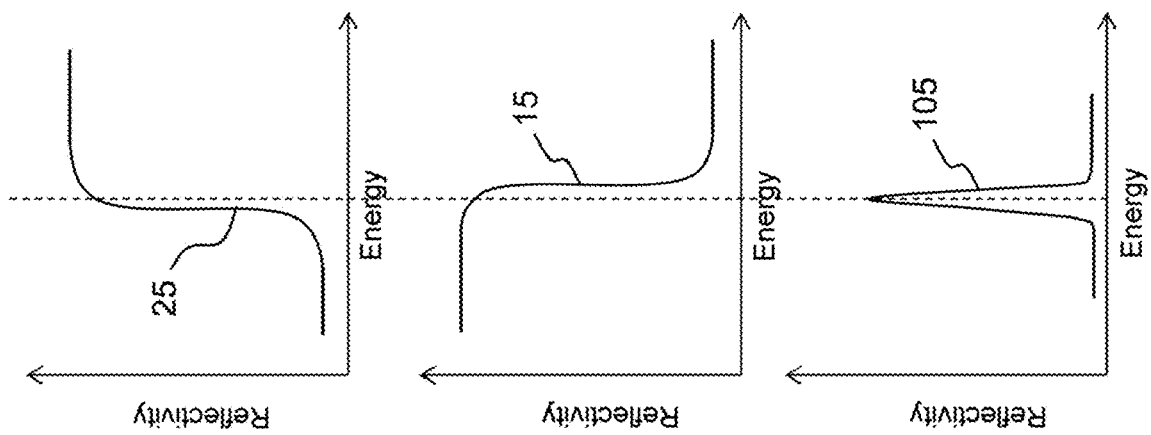

Throughout the rest of the description, the mirror having a first, high-pass energy spectral response is simply referred to as the "high-pass mirror" and the mirror having a second, low-pass energy spectral response is simply referred to as the "low-pass mirror".

The term "energy spectral response of the mirror" is understood to mean the reflectance curve of the mirror as a function of energy in the XUV.

The applicants have demonstrated that it is possible to obtain, by virtue of the spectral selection component according to the present description, a tunability over a spectral range of at least 20 eV while maintaining the full width at half maximum of the reflectance spectral response at better than 0.1 eV, and while retaining excellent rejection. This technical effect is obtained through the only partial overlap in the responses of each mirror in combination with the steepness of a flank of each mirror and with the very high rejection on the side of this flank.

Specifically, in the spectral selection component thus defined, the spectral band is defined by the positions of the flanks on the high-energy side for the low-pass mirror and on the low-energy side for the high-pass mirror, respectively, rather than by the spectral band of a single mirror as before.

In the present description, the overlap between the responses is said to be "only partial" if the energy corresponding to ½₅ of the maximum reflectance of the low-pass mirror on the flank of the high-energy side is strictly higher than the energy corresponding to ½₅ of the maximum reflectance of the high-pass mirror on the flank of the low-energy side and the difference in energies corresponding to half of the maximum reflectance of the high-pass mirror on the flank of the low-energy side and the low-pass mirror on the flank of the high-energy side, respectively, is (in terms of absolute value) strictly smaller than 90% of the smallest full width at half maximum of the (energy) spectral responses of the high-pass and low-pass mirrors.

According to one or more exemplary embodiments, the input and output mirrors are multiperiodic, advantageously biperiodic, or aperiodic multilayer mirrors.

According to one or more exemplary embodiments, the first plane of incidence and second plane of incidence are coincident.

According to one or more exemplary embodiments, the spectral selection component according to the present description comprises means for coupling the rotations of the first and second mirrors about the first and second axes of rotation, respectively, allowing the output axis to be kept parallel to the input axis. Thus, the rotation of one mirror is carried out in a manner that is dependent on that of the other mirror so as to keep the output axis parallel to the input axis.

According to one or more exemplary embodiments, the spectral selection component further comprises means for translating one and/or the other of the first and second mirrors along an axis that is parallel to the input axis, allowing the output axis to be kept fixed when the mirrors are rotated.

According to one or more exemplary embodiments,
at least one of the first and second mirrors has a lateral thickness gradient in a direction that is substantially perpendicular to the plane of incidence of the mirror;
the component further comprises means for translating said mirror in the direction of the gradient.

Throughout the rest of the description, an axis or a surface/plane is said to be substantially parallel to another axis or to another surface/plane if the departure from parallelism is less than 3°. Similarly, an axis or a surface/plane is said to be substantially perpendicular to another axis or to another surface/plane if the departure from perpendicularity is less than 3°.

Another subject of the present description, according to a second aspect, is a system for emitting an XUV radiation beam, comprising an XUV radiation source for emitting an XUV radiation beam in a given direction and a spectral selection component according to the first aspect, for receiving said radiation beam along its input axis.

Applications for the spectral selection components described in the present description are in particular in the instrumentation for XUV coherent sources. The spectral selection components described in the present description are particularly advantageous when they are coupled with an HHG source, since they allow an energy with a constant bandwidth to be selected and, according to one or more exemplary embodiments, the energy and the pulse duration to be adjusted independently. They may also be applied to other XUV sources as monochromators.

The spectral selection component may also be used advantageously with other types of sources (plasmas, synchrotron radiation, etc.), for example for extreme-UV spectroscopy in astrophysics (incoherent radiation), instrumentation on synchrotron sources or even X-ray spectrometry of dense plasmas. In particular, the twofold (energy and bandwidth) tunability of the device affords an advantage with respect to the solutions currently in use.

Another subject of the present description, according to a third aspect, is a method for spectrally selecting an XUV radiation beam ($I_1$) having a wide spectral band, comprising:
the reflection, by a first multilayer mirror, of the XUV radiation beam along an input axis located in a first plane of incidence;
the reflection, by a second multilayer mirror, of the XUV radiation beam reflected by the first mirror toward an output axis of the spectral selection component, the beam reflected by the second mirror and the output axis being located in a second plane of incidence;
the rotation of the first mirror about a first axis of rotation that is substantially perpendicular to the first plane of incidence and the rotation of the second mirror about a second axis of rotation that is substantially perpendicular to the second plane of incidence in order to change the energy of the output XUV radiation beam;
wherein:
one of said mirrors has a first, high-pass energy spectral response, with a flank on the low-energy side with a steepness that is greater than $0.1\ eV^{-1}$ and a rejection of low energies that is greater than 20;
the other of said mirrors has a second, low-pass energy spectral response, with a flank on the high-energy side with a steepness that is greater than $0.1\ eV^{-1}$ and a rejection of high energies that is greater than 20;
said mirrors have an only partial overlap in their spectral energy responses.

According to one or more exemplary embodiments, the rotations of the first and second mirrors are coupled, allowing the output axis to be kept parallel to the input axis. The coupling may be performed manually or automatically using coupling means.

According to one or more exemplary embodiments, the method further comprises the translation of one and/or the other of the first and second mirrors along an axis that is substantially parallel to the input axis, allowing the output axis to be kept fixed when the mirrors are rotated.

According to one or more exemplary embodiments, at least one of the first and second mirrors has a lateral thickness gradient in a direction that is substantially perpendicular to the plane of incidence of the mirror, the method further comprising translating said mirror in the direction of the gradient in order to modify the spectral width of the output XUV radiation beam.

Figure 1B:
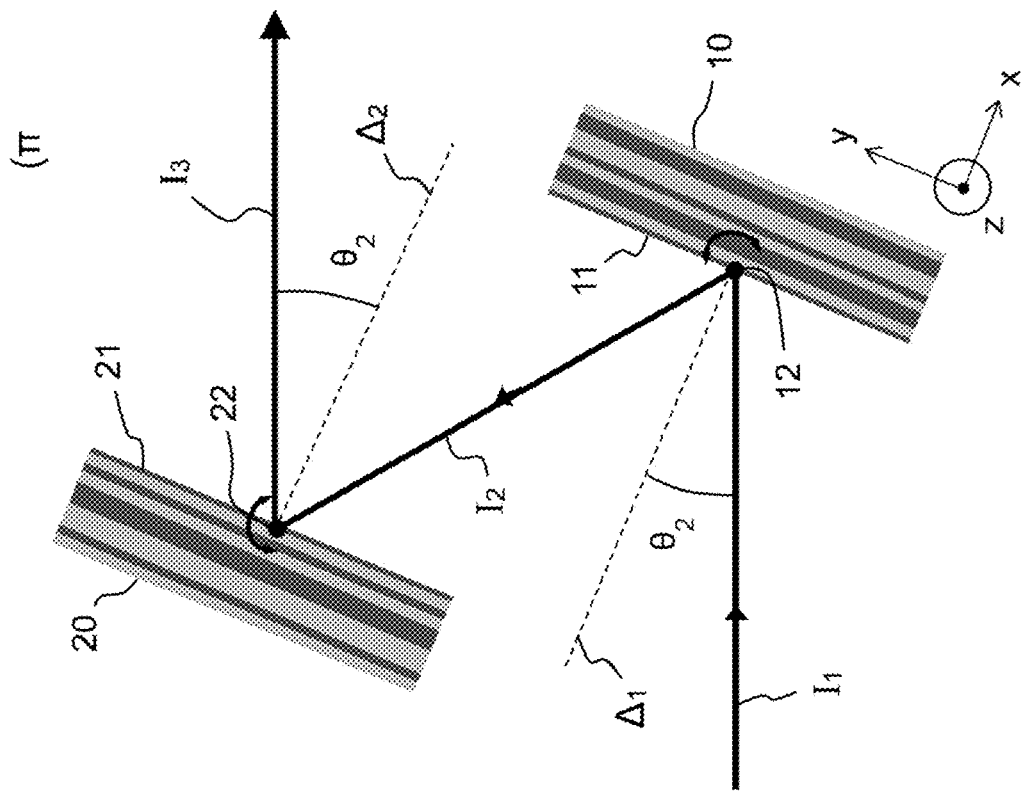
FIG. 1B schematically shows the same component, receiving a XUV radiation beam along an input axis forming, with the first mirror, a second angle of incidence, different from the first angle of incidence.
Figure 1B:
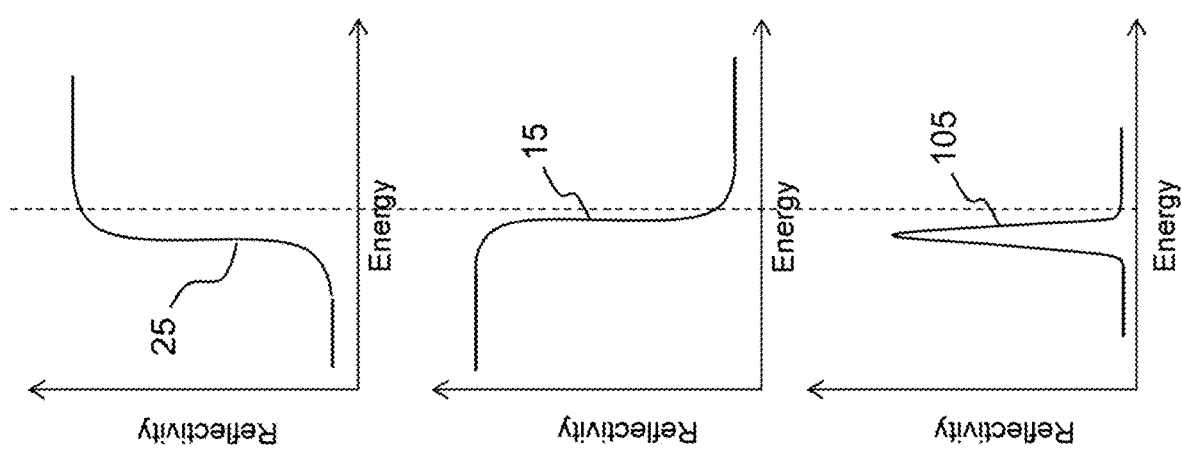

FIGS. 1A and 1B illustrate the operation of one exemplary spectral selection component 100 according to the present description.

In these examples, an XUV radiation beam $I_1$ is transmitted along an input axis forming a respective angle of incidence $\theta_1$ (FIG. 1A) with the normal $\Delta_1$ to the first mirror 10 (also referred to as the input mirror in the present application) or an angle of incidence $\theta_2$ (FIG. 1B), the first mirror having been rotated.

In these figures, an XYZ coordinate system located in the frame of reference of the first mirror or input mirror 10 is shown.

As illustrated in FIG. 1A, the spectral selection component 100 comprises a first multilayer mirror 10 (input mirror) with a surface 11 for receiving an XUV radiation beam $I_1$ along an input axis located in a first given plane of incidence Π, which also contains the normal $\Delta_1$ to the surface of the first mirror. The input axis is generally a predefined, fixed axis, which will allow the spectral selection component to be easily incorporated within a system further comprising the XUV radiation source for example, with a view to a given application. The spectral selection component 100 further comprises a second multilayer mirror 20 (output mirror) with a surface 21 for receiving an XUV radiation beam $I_2$ reflected by the first mirror 10 in order to transmit it in the form of a radiation beam $I_3$ to an output axis of the spectral selection component. The output axis is located in a second plane of incidence, which is the plane of incidence of the second mirror, defined as the plane comprising the reflected beam $I_2$ and the normal $\Delta_2$ to the surface of the second mirror. The surfaces may be planar, as illustrated in FIGS. 1A and 1B, or exhibit a curvature, in particular if it is sought to converge/diverge the XUV radiation beam.

In practice, it should be sought to have the first plane of incidence and the second plane of incidence coincident so as to form a single plane of incidence Π, as illustrated in FIGS. 1A and 1B. Specifically, this greatly simplifies the design of the mirrors. To achieve this, it should be ensured that the surfaces of the mirrors 10 and 20 are substantially parallel to one another if the surfaces are planar, or that the tangents to these surfaces at the points of intersection with the axes of the incident radiation beams are substantially parallel to one another if the surfaces exhibit a curvature.

The first and second multilayer mirrors 10 and 20 each comprise an axis of rotation that is perpendicular to the plane of incidence of the mirror, these being denoted by 12 and 22, respectively, in FIGS. 1A and 1B. As illustrated in the figures, the axis of rotation of each mirror is for example substantially tangential to the surface of the mirror that is intended to receive the radiation beam. It is generally sought to have the axis of rotation of each mirror pass through a point located in proximity to the point of intersection of the axis of the radiation beam with the surface of the mirror, which makes it possible to limit the displacement of the beam on the mirror when the mirror is rotated.

According to one exemplary embodiment, the spectral selection component further comprises means for coupling the rotations of the input 10 and output 20 mirrors (which are not shown in the figures), allowing the mirrors to be rotated concomitantly so as to keep the direction of the output axis substantially constant, parallel to the input axis. Thus, as is apparent in FIG. 1B, the rotation of the input mirror 10 about its axis of rotation 12 takes place at the same time as a rotation of the output mirror 20 about its axis of rotation 22 such that the direction of the axis of the radiation $I_3$ output by the component remains constant as the angle of incidence on the input mirror 10 varies due to the rotation of the first mirror 10. In this way, the angles of incidence of the XUV radiation on each of the input and output mirrors are substantially identical, which also makes it possible to have similar angular variations in the angles of incidence on each of the mirrors as the mirrors are rotated, and hence improved conservation of the full width at half maximum of the spectral band. In practice, the rotations of the mirrors are coupled so that the surfaces of the input/output 10 and 20 mirrors, respectively, remain substantially parallel if the surfaces are planar, or that the tangents to these surfaces at the points of intersection with the axes of the incident radiation beams remain parallel if the surfaces exhibit a curvature.

According to one exemplary embodiment, the spectral selection component further comprises means for translating one and/or the other of the input 10 and output 20 mirrors (which are not shown in FIGS. 1A and 1B) along an axis that is substantially parallel to the input axis. When the rotations of the input and output mirrors are coupled so as to keep the direction of the output axis fixed, it may be advantageous also to make provision for a translation of one of the mirrors in order to correct for the displacement of the output axis so that it remains fixed when the mirrors are rotated. This is useful in particular when the spectral selection component is incorporated within a system that requires a variable energy XUV radiation beam to be received along a predetermined axis.

Unlike the spectral selection components of the prior art, the first and second multilayer mirrors 10 and 20 are not identical. They have high-pass and low-pass reflectance energy spectral responses, respectively, as schematically represented by the curves 15 and 25 in FIGS. 1A and 1B. Specifically, the applicants have demonstrated that the response resulting from the combination of these two mirrors, schematically represented on the curve 105, exhibits a very small variation in the full width at half maximum with respect to that resulting from the combination of two mirrors having identical reflectance energy responses.

Figure 2A:
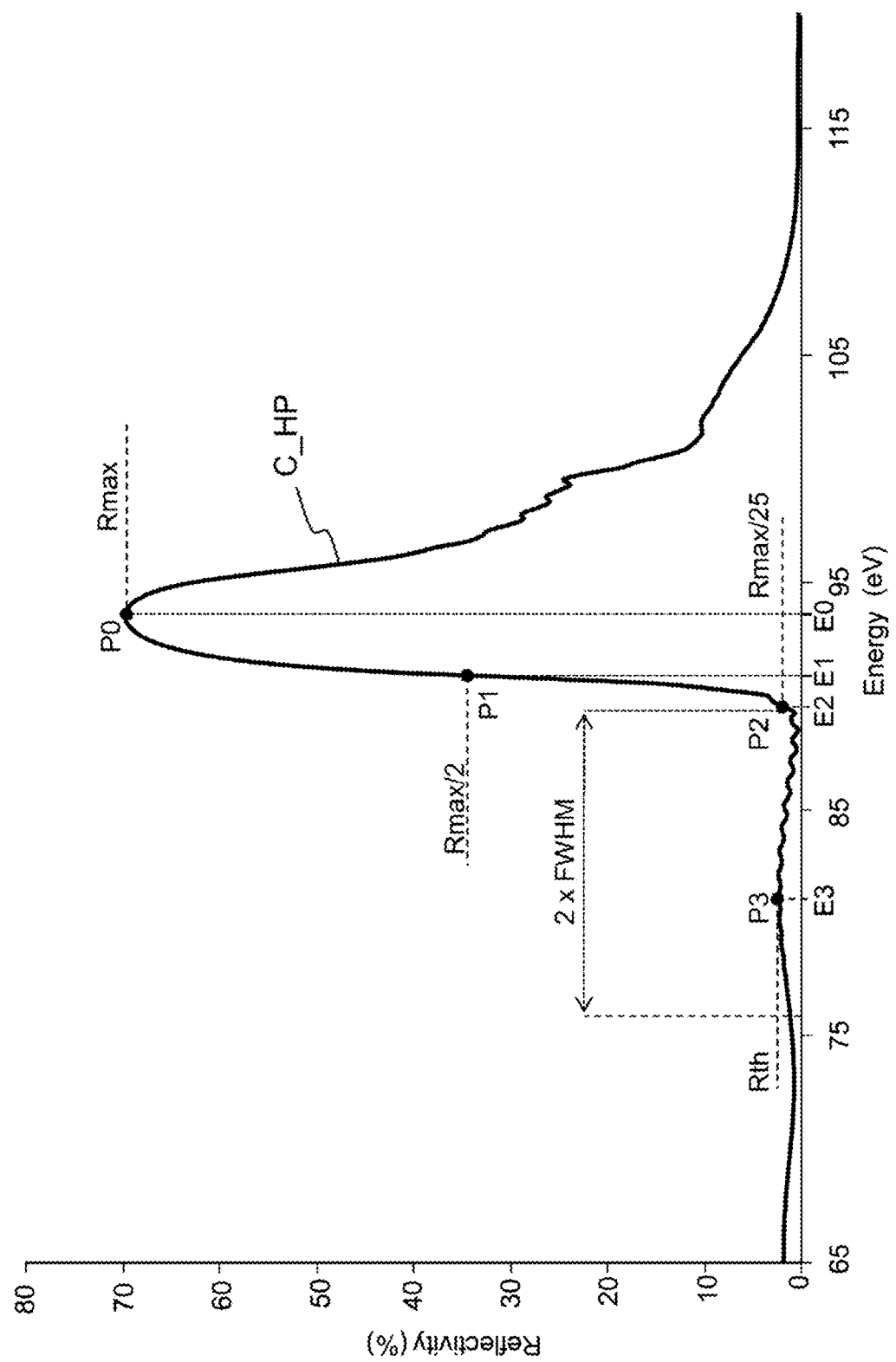
FIG. 2A shows, for illustrative purposes, an exemplary energy spectral response curve of the reflectance of a "high-pass" multilayer mirror according to the present description.

An exemplary reflectance energy response of a high-pass filter suitable for forming a spectral selection component according to the present description is shown in greater detail in FIG. 2A.

Figure 7A:
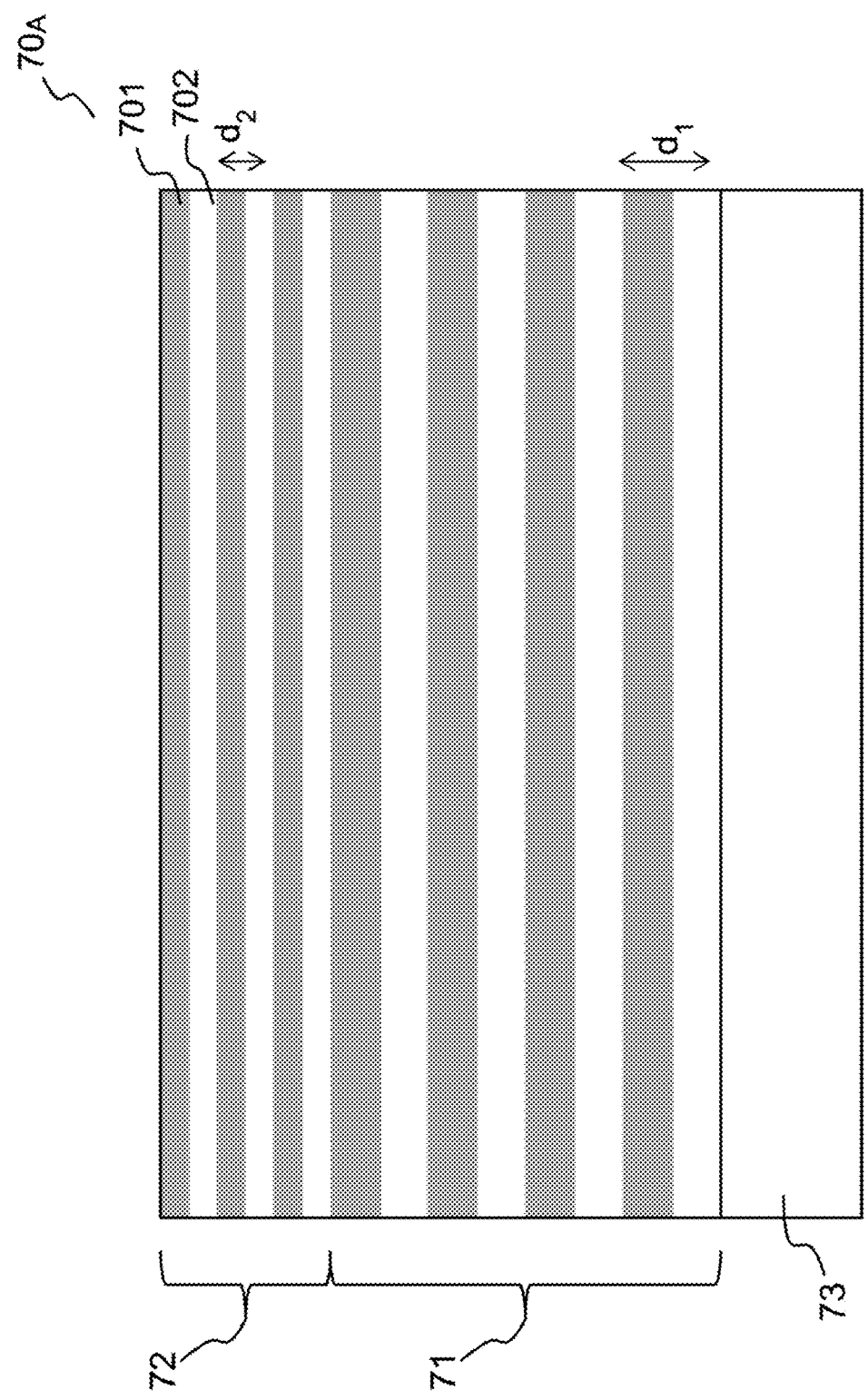
FIGS. 7A and 7B illustrate exemplary embodiments of biperiodic and aperiodic, respectively, multilayer mirrors suitable for obtaining a spectral selection component according to the present description.

The curve (C_HP) is calculated for a biperiodic multilayer mirror, of the type shown in FIG. 7A, with alternating layers of molybdenum 702 (Mo) and of silicon 701 (Si). The lower multilayer (71, FIG. 7A), on the substrate 73 side, comprises an arrangement of 68 periods of layers of Mo with a thickness of 2.175 nm and of layers of Si with a thickness of 7.55 nm. The upper multilayer (72, FIG. 7A), on the surface side, comprises an arrangement of 6 periods of layers of Mo with a thickness of 3.025 nm and of layers of Si with a thickness of 6.3 nm.

It is possible to define, in a general manner, the following points on the response curve giving the reflectance as a function of energy for a mirror suitable for a spectral selection component according to the present description:

P0 (E0, Rmax) point on abscissa E0 exhibiting a maximum reflectance Rmax;

P1 (E1, Rmax/2) point on abscissa E1 exhibiting a reflectance Rmax/2 on the low- (or high-) energy side for a high-pass (or low-pass, respectively) mirror, this side being called the "steep flank" of the response in the present description;

P2 (E2, Rmax/25) point on abscissa E2 exhibiting a reflectance Rmax/25 on the low- (or high-) energy side for a high-pass (or low-pass, respectively) mirror, i.e. on the steep-flank side;

P3 (E3, Rth) point on abscissa E3 exhibiting a maximum reflectance Rth over the spectral range [E2−2*FWHM; E2] for the high-pass mirror or [E2; E2+2*FWHM] for the low-pass mirror, where FWHM is the full width at half maximum in terms of energy of the response of the mirror.

Figure 2B:
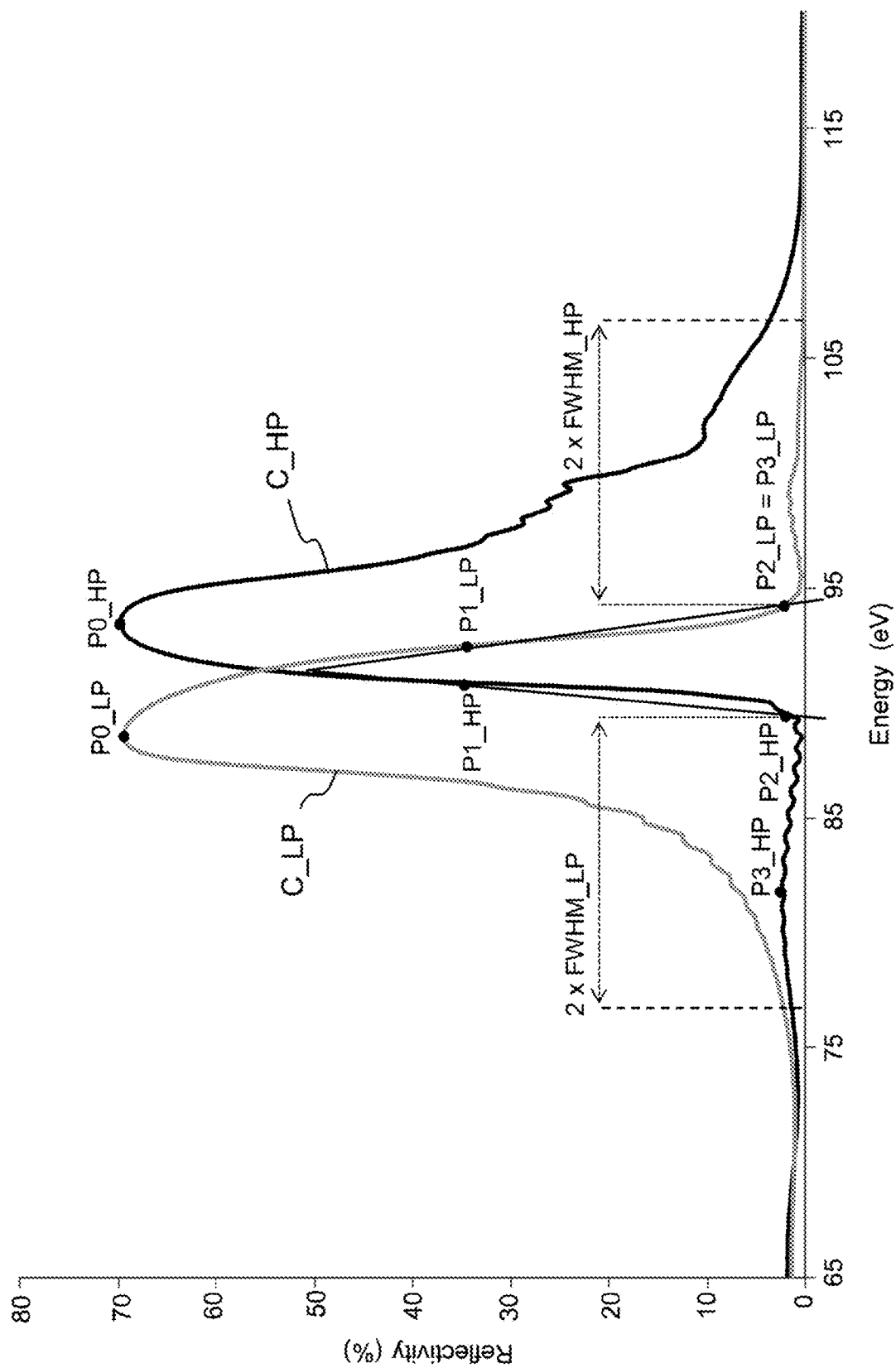
FIG. 2B shows, for illustrative purposes, examples of energy spectral response curves of the reflectance of two, "high-pass" and "low-pass", respectively, multilayer mirrors in one exemplary spectral selection component according to the present description.

FIG. 2B shows exemplary reflectance energy responses of a high-pass filter (curve C_HP) and of a low-pass filter (curve C_LP) suitable for working in combination with the high-pass filter. The high-pass filter (curve C_HP) is identical to that the response of which is shown in FIG. 2A.

The curve C_LP is calculated for a biperiodic multilayer mirror, of the type shown in FIG. 7A, with alternating layers of molybdenum 702 (Mo) and of silicon 701 (Si). The lower multilayer (71, FIG. 7A), on the substrate side, comprises an arrangement of 68 periods of layers of Mo with a thickness of 2.8 nm and of layers of Si with a thickness of 7.4 nm. The upper multilayer (72, FIG. 7A), on the surface side, comprises an arrangement of 6 periods of layers of Mo with a thickness of 2.425 nm and of layers of Si with a thickness of 8.0 nm.

As illustrated in FIG. 2B, the points P1, P2 and P3 corresponding to the high-pass mirror (or low-pass mirror, respectively) will more specifically be denoted by P1_HP (or P1_LP, respectively), P2_HP (or P2_LP, respectively) and P3_HP (or P3_LP, respectively).

FIG. 2C illustrates the energy response of the reflectance of a spectral selection component combining the high-pass and low-pass mirrors, the responses of which are shown in FIG. 2B.

To produce a spectral selection component according to the present description, a high-pass mirror will be chosen with a flank on the low-energy side (steep flank) with a steepness that is greater than 0.1 eV$^{-1}$ and a rejection of low energies that is greater than 20, and a low-pass mirror will be chosen with a flank on the high-energy side (steep flank) with a steepness that is greater than 0.1 eV$^{-1}$ and a rejection of high energies that is greater than 20. Furthermore, the high-pass and low-pass mirrors have an only partial overlap in their spectral energy responses. It should be noted that the high-pass mirror (or the low-pass mirror) may equally be the input mirror or the output mirror.

In the present description, the steepness of the steep flank is defined by the absolute value of the slope connecting the points P1 and P2 (FIG. 2A).

The rejection is defined as the ratio of Rmax to Rth.

The overlap is said to be "only partial" if the energy corresponding to 1/25 of the maximum reflectance of the low-pass mirror on the flank of the high-energy side is strictly higher than the energy corresponding to 1/25 of the maximum reflectance of the high-pass mirror on the flank of the low-energy side and if the difference in energies corresponding to half of the maximum reflectance of the high-pass mirror on the flank of the low-energy side and the low-pass mirror on the flank of the high-energy side, respectively, is (in terms of absolute value) strictly smaller than 90% of the smallest full width at half maximum of the (energy) spectral responses of the high-pass and low-pass mirrors; in other words if:

$$E2\_HP<E2\_LP \text{ and}$$

$$ABS(E1\_HP-E1\_LP)<0.9*\text{MIN}[\text{FWHM}\_HP, \text{FWHM}\_LP]$$

As can be seen in FIG. 2B, it matters little that the reflectance drops on the high-energy side in the case of the high-pass mirror or on the low-energy side in the case of the low-pass mirror; rather, what matters is that there is sufficient asymmetry in the response of each mirror that the steepness and the rejection on the steep flank of each of the responses are maintained when the angle of incidence is varied (which shifts the energy responses of the mirrors), and that a sufficient overlap in the responses is maintained.

Thus, unlike the multilayer mirrors of the spectral selection components according to the prior art, for which it was sought to obtain a symmetrical reflectance energy response while maintaining the full width at half maximum, in the component according to the present description, a response with a single steep flank exhibiting high rejection and an overlap in the responses that is only partial is sought for each mirror. It matters little that the full width at half maximum of the response of each mirror varies with the angle of incidence; specifically, the response of the spectral selection component (see curve C, FIG. 2C) is now defined by each of the steep flanks of the responses of each mirror.

It should be noted that it is entirely possible for a person skilled in the art, using known design tools, to design multilayer mirrors addressing these dimensioning constraints, as will be explained in greater detail below.

Figure 3A:
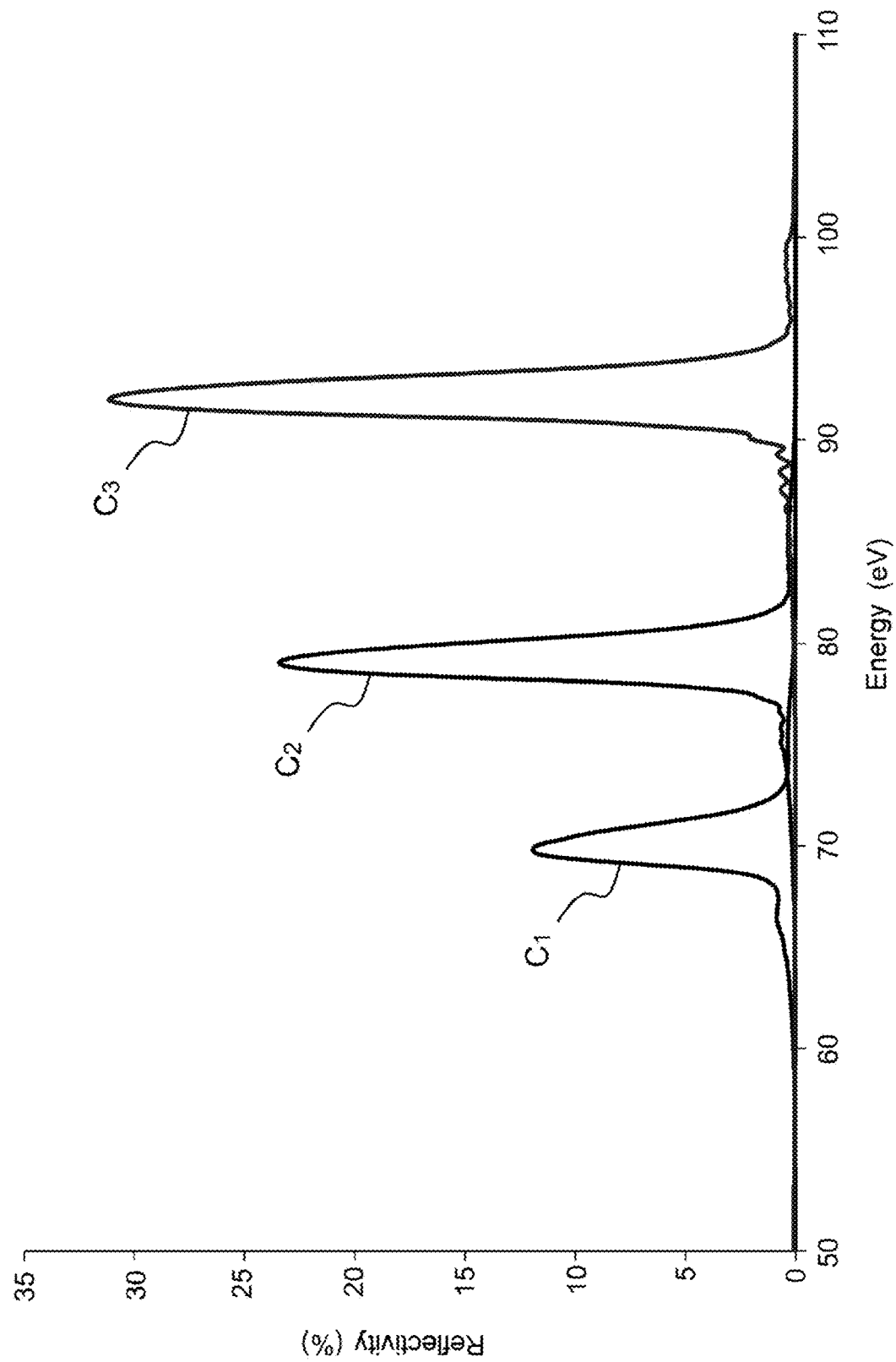
FIG. 3A illustrates energy spectral response curves of the reflectance for a component combining high-pass and low-pass mirrors, the responses of which are shown in FIG. 2B, when the angle of incidence is varied.

FIG. 3A illustrates, using an example, reflectance response curves of a spectral selection component combining two multilayer mirrors with responses shown in FIG. 2B. The curves $C_1$-$C_3$ correspond to angles of incidence on the input mirror (and on the output mirror) of $\theta_1=19°$, $\theta_1=33.75°$ and $\theta_1=45.25°$, respectively. The full width at half maximum is 2.10 eV, 2.03 eV and 2.10 eV, respectively. The full width at half maximum of the response therefore varies between these curves by 0.07 eV, i.e. by less than 3.5%.

Figure 3B:
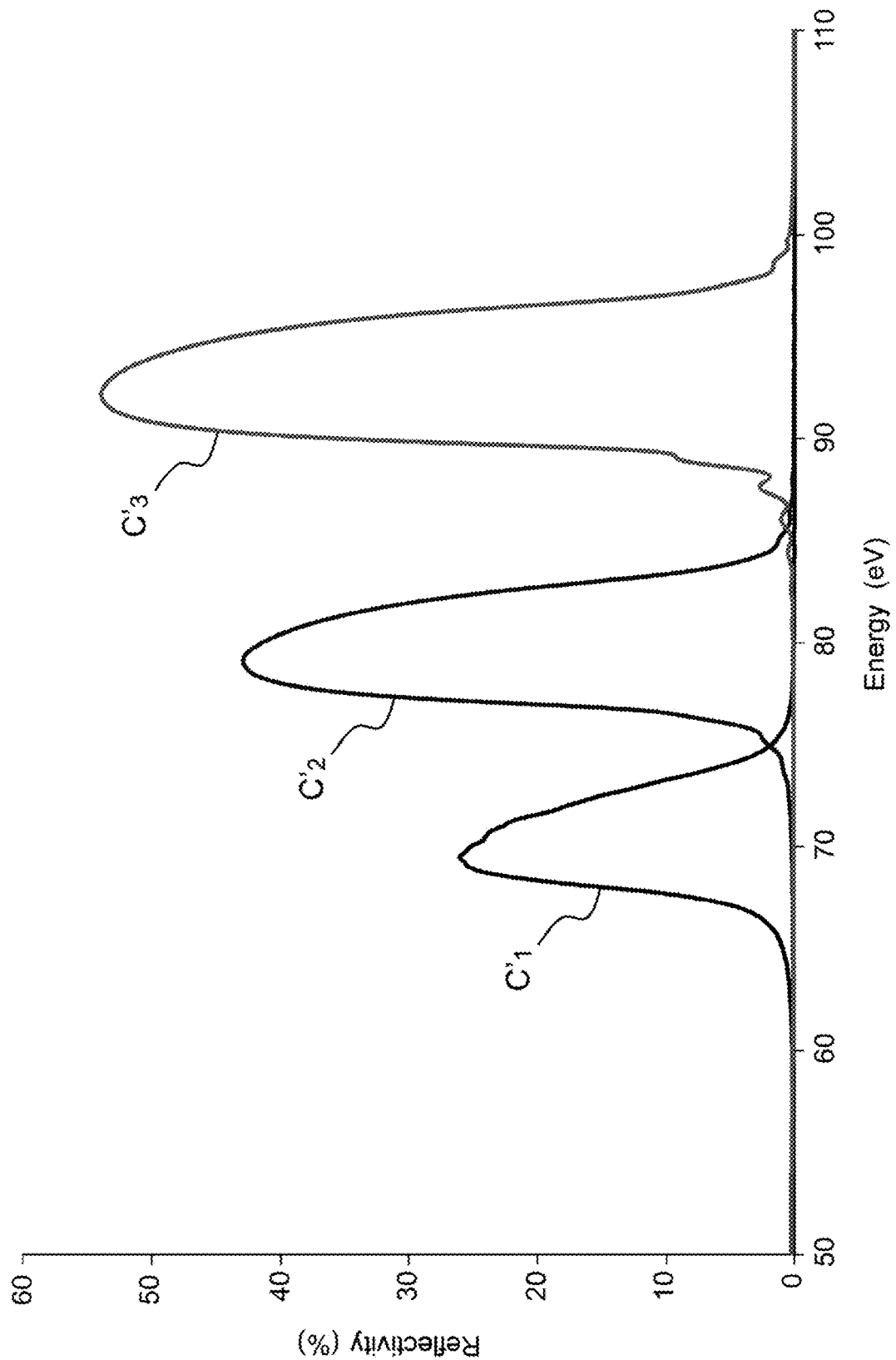
FIG. 3B illustrates, for comparative purposes, energy spectral response curves of the reflectance for a spectral selection component according to the prior art, when the angle of incidence is varied.

By way of comparison, FIG. 3B shows reflectance response curves of a spectral selection component combining two identical multilayer mirrors.

The multilayer mirror used to calculate the curves shown in FIG. 3B is optimized for operation at $\theta_1=45.25°$. It is a periodic multilayer mirror, with alternating layers of molybdenum (Mo) and of silicon (Si). The multilayer comprises an arrangement of 40 periods of layers of Mo with a thickness of 3.925 nm and of layers of Si with a thickness of 6.075 nm.

In FIG. 3B, the curves $C'_1$-$C'_3$ are calculated as for FIG. 3A with angles of incidence on the input mirror (and on the output mirror) of $\theta_1=19°$, $\theta_1=33.75°$ and $\theta_1=45.25°$, respectively. It can be seen that the full width at half maximum is 4.80 eV, 5.63 eV and 6.45 eV, respectively. The full width at half maximum of the response therefore varies between these curves by 1.65 eV, i.e. 34.4%.

Although the reflectance is higher with two identical periodic mirrors, it is observed that with the spectral component dimensioned according to the present description, selectivity and stabilization of the spectral width are substantially better.

Figure 4A:
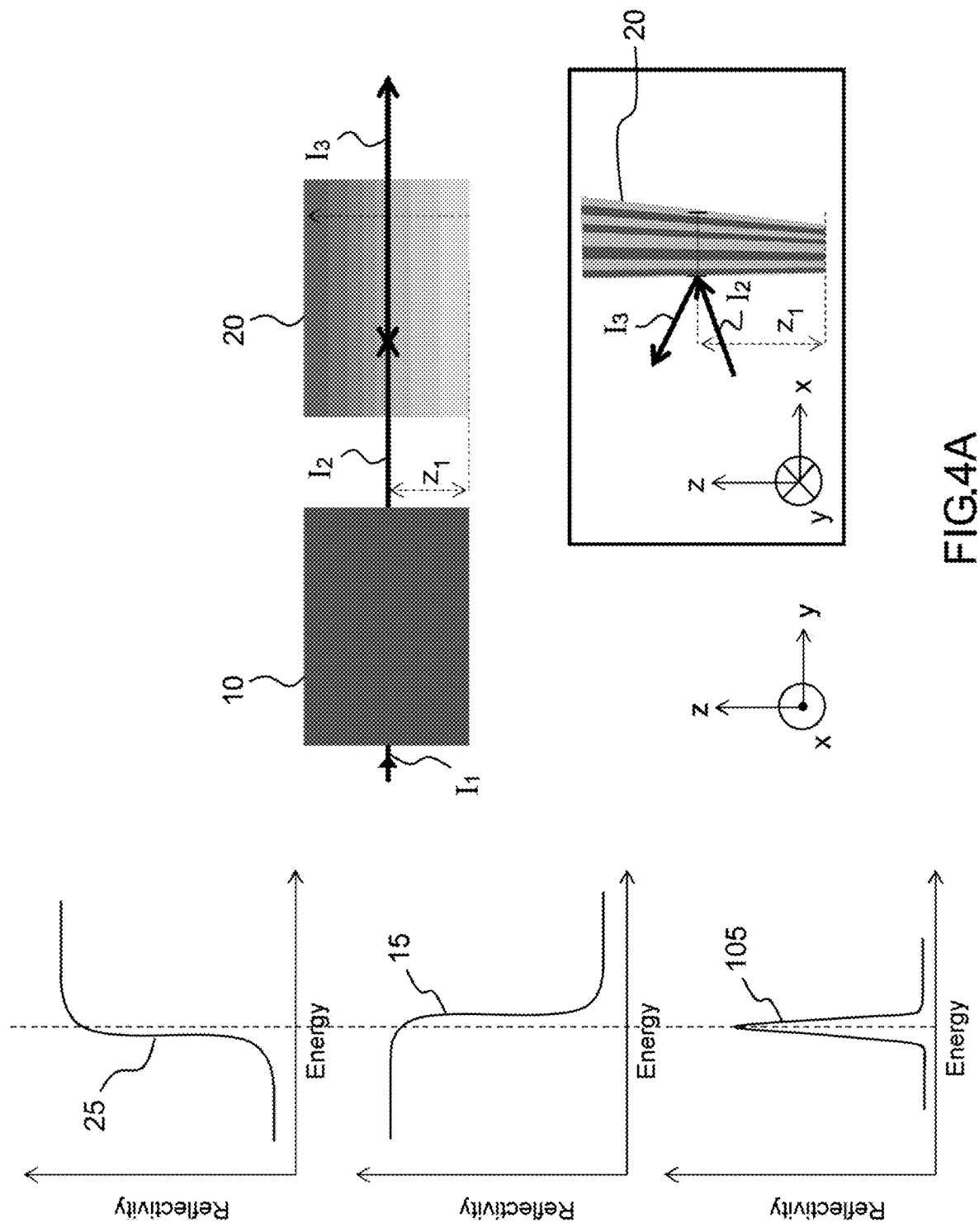
FIGS. 4A and 4B illustrate one exemplary embodiment of a spectral selection component according to the present description, in which one of the first and second mirrors has a thickness gradient.
Figure 4B:
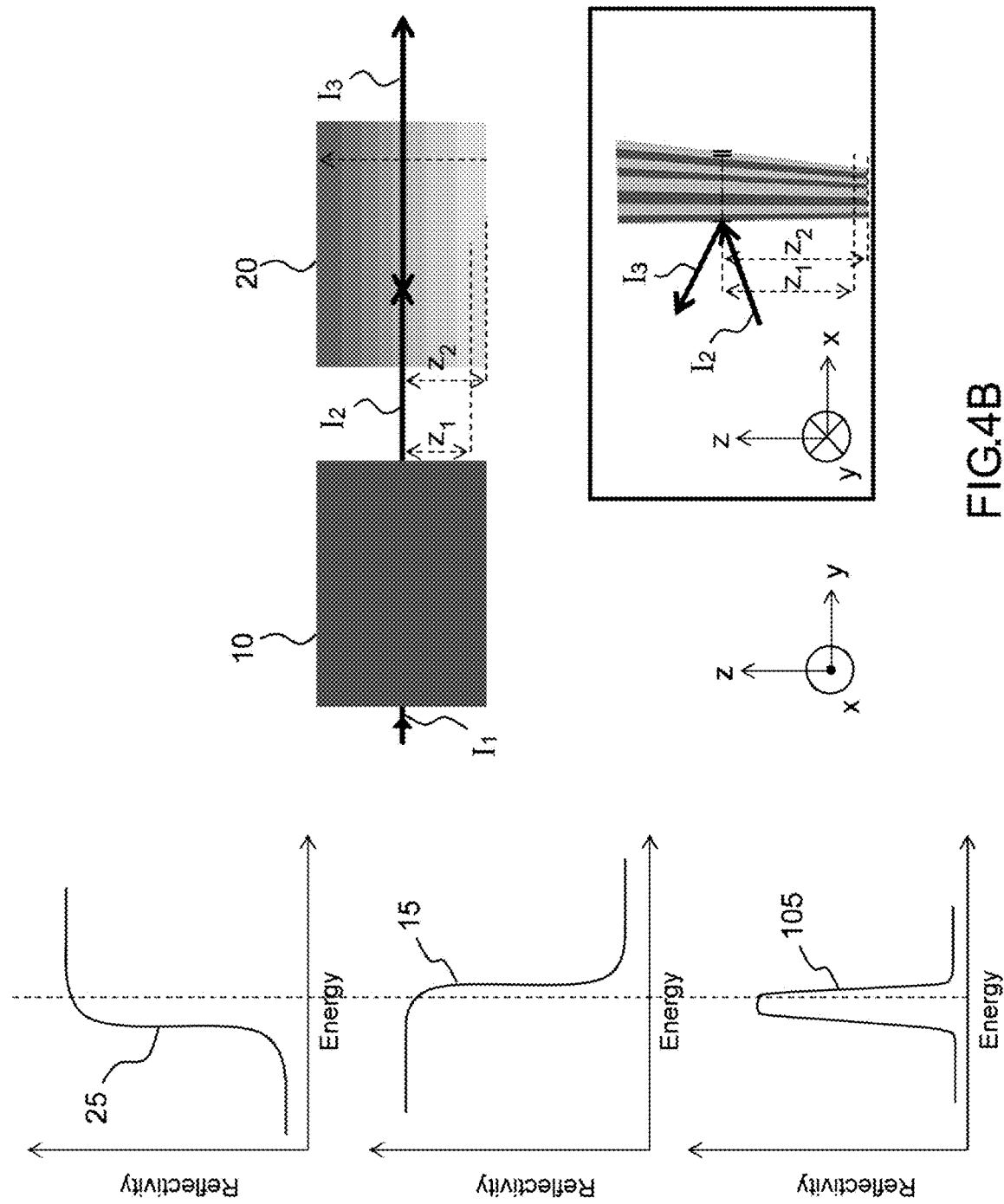

FIGS. 4A and 4B illustrate another exemplary embodiment in which at least one of the two mirrors 10 and 20 of the spectral selection component has a lateral thickness gradient in a direction that is perpendicular to the plane of incidence. In the example of FIG. 4A, it is the output mirror 20 which has a thickness gradient.

It is then shown that the width of the reflectance energy response of the spectral selection component (curve 105) is dependent on the height at which the radiation $I_2$ is incident on the output mirror 20, the height being defined along the axis running parallel to the axis of the gradient, i.e. here along the axis z perpendicular to the plane of incidence. As illustrated in the boxes of FIGS. 4A and 4B, the thicknesses of the layers as seen by the beam differ with the height thereof. The variation in thickness over the entire surface is of the order of a few percent. This results in a gradual variation in the period of the multilayer along its surface and thus (with reference to Bragg's law: $\lambda=2d*\sin(\theta)$) a variation in the position in terms of wavelength/energy of the maximum reflectance of the spectral response of the mirror is obtained. This effect makes it possible, by moving the mirror possessing the gradient along the axis of this gradient, to adjust the overlap in the spectral responses of the two mirrors and thus to act on the spectral width and the maximum reflectance of the response of the device.

Figure 5A:
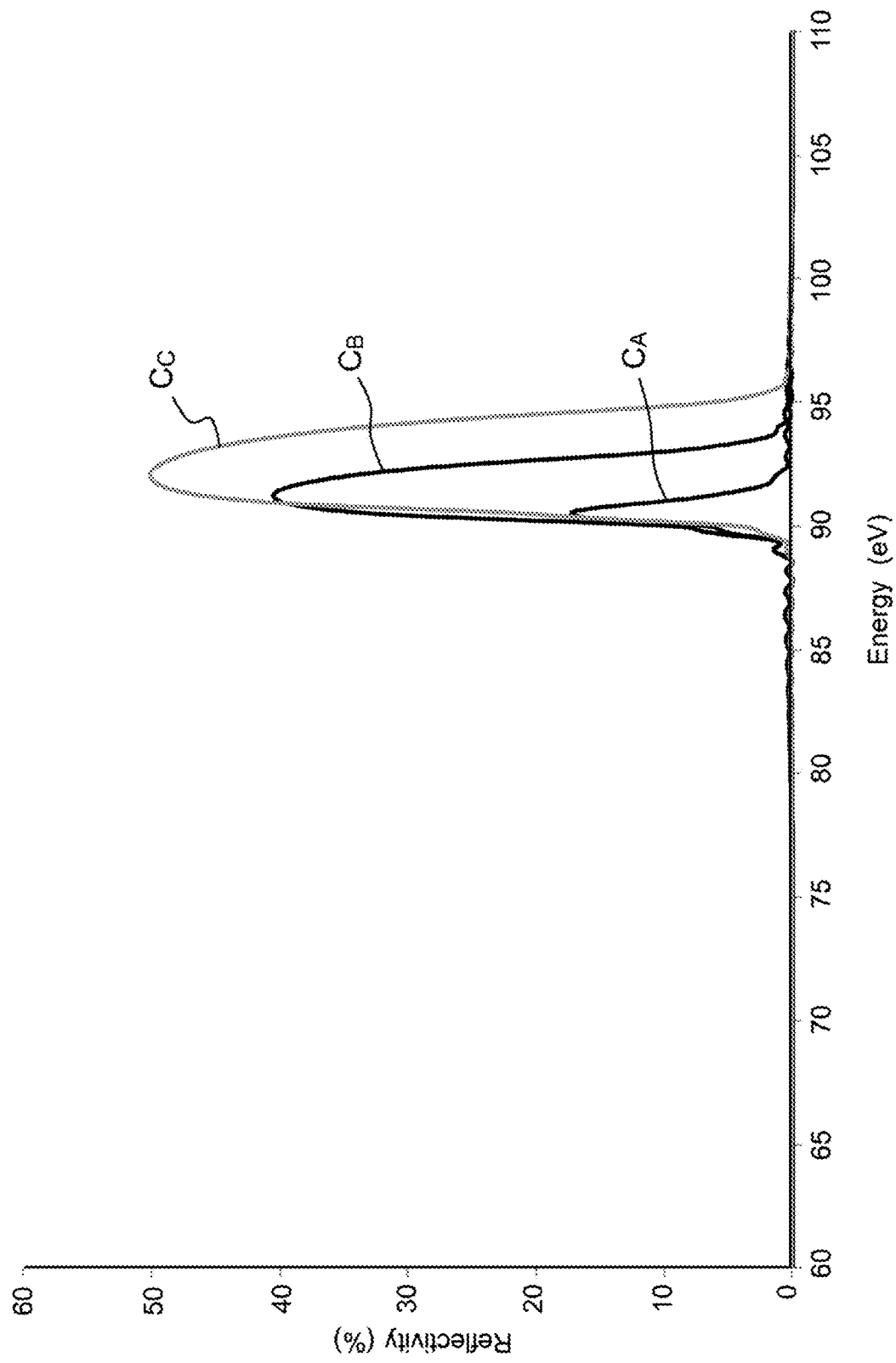
FIG. 5A illustrates the reflectance spectral response curve of a component such as shown in FIG. 4A, for various positions of the radiation beam on the mirror with a thickness gradient.

Thus, FIG. 5A illustrates three curves $C_A$, $C_B$ and $C_C$, illustrating the reflectance energy response of the spectral selection component for three height values corresponding to gradient values of 0%, 2.5% and 5% (which values are expressed as a percentage variation in thickness), respectively. The obtained full widths at half maximum are 0.9 eV, 2.4 eV and 4.25 eV, respectively.

Figure 5B:
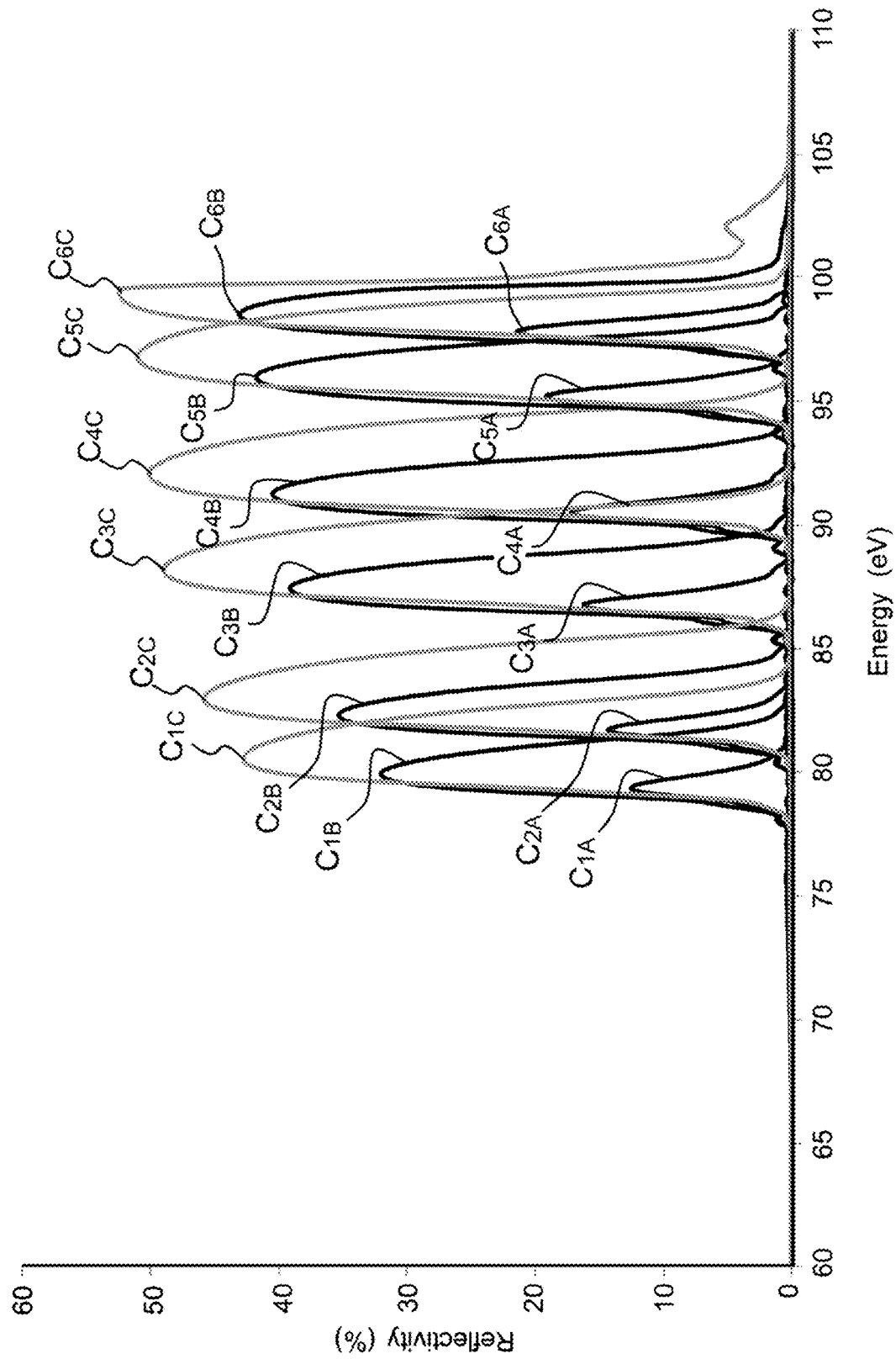
FIG. 5B illustrates the reflectance spectral response curve of a component such as shown in FIG. 4A, for various positions of the radiation beam on the mirror with a thickness gradient and various angles of incidence.

The example presented in FIGS. 5A and 5B has been produced using an arrangement of two, "high pass" and "low pass", multilayer mirrors, the characteristics of which are given below.

The "low-pass" multilayer mirror is a biperiodic multilayer mirror, of the type shown in FIG. 7A, with alternating layers of molybdenum (Mo) and of silicon (Si). The lower multilayer (71, FIG. 7A), on the substrate 73 side, comprises an arrangement of 68 periods of layers of Mo with a thickness of 2.45 nm and of layers of Si with a thickness of 5.9 nm. The upper multilayer (72, FIG. 7A), on the surface side (the Si layers being deposited on the Mo layers), comprises an arrangement of 6 periods of layers of Mo with a thickness of 2.55 nm and of layers of Si with a thickness of 6.1 nm.

The "high-pass" multilayer mirror is a biperiodic multilayer mirror, of the type shown in FIG. 7A, with alternating layers of molybdenum (Mo) and of silicon (Si). The lower multilayer (71, FIG. 7A), on the substrate side, comprises an arrangement of 68 periods of layers of Mo with a thickness of 2.6 nm and of layers of Si with a thickness of 5.4 nm. The upper multilayer (72, FIG. 7A), on the surface side (the Si layers being deposited on the Mo layers), comprises an arrangement of 6 periods of layers of Mo with a thickness of 3.0 nm and of layers of Si with a thickness of 4.65 nm.

In this example, the gradient is on the low-pass mirror. In FIG. 5, the curve $C_A$ corresponds to the thicknesses given above. The curves $C_B$ and $C_C$ are obtained by decreasing the thicknesses of the given coating for the low-pass mirror by 2.5% and 5%, respectively.

A more complete description of the design of multilayer mirrors with a thickness gradient may be found for example in the article by Morawe et al. ("*Design and performance of graded multilayers as focusing elements for x-ray optics*", Rev Sci Instrum, 70(8), (1999))

FIG. 5B again illustrates these three curves, but this time also as a function of angle of incidence. More specifically, each of the curves referenced A, B and C corresponds to a thickness gradient such as specified above and each curve referenced 1 to 6 corresponds to an angle of incidence of 5°, 15°, 25°, 30°, 35.5° and 37.5°, respectively.

It is observed that controlling the bandwidth by means of the gradient effect is possible over the entire energy tunability range of the device.

Applications for the spectral selection components described in the present description are in particular in the instrumentation for XUV coherent sources, but they could also be used advantageously on other types of sources (plasmas, synchrotron radiation, etc.), for example for extreme-UV spectroscopy in astrophysics (incoherent radiation), instrumentation on synchrotron sources or even X-ray spectrometry of dense plasmas. In particular, the twofold (energy and bandwidth) tunability of the device affords an advantage with respect to the solutions currently in use.

Figure 6A:
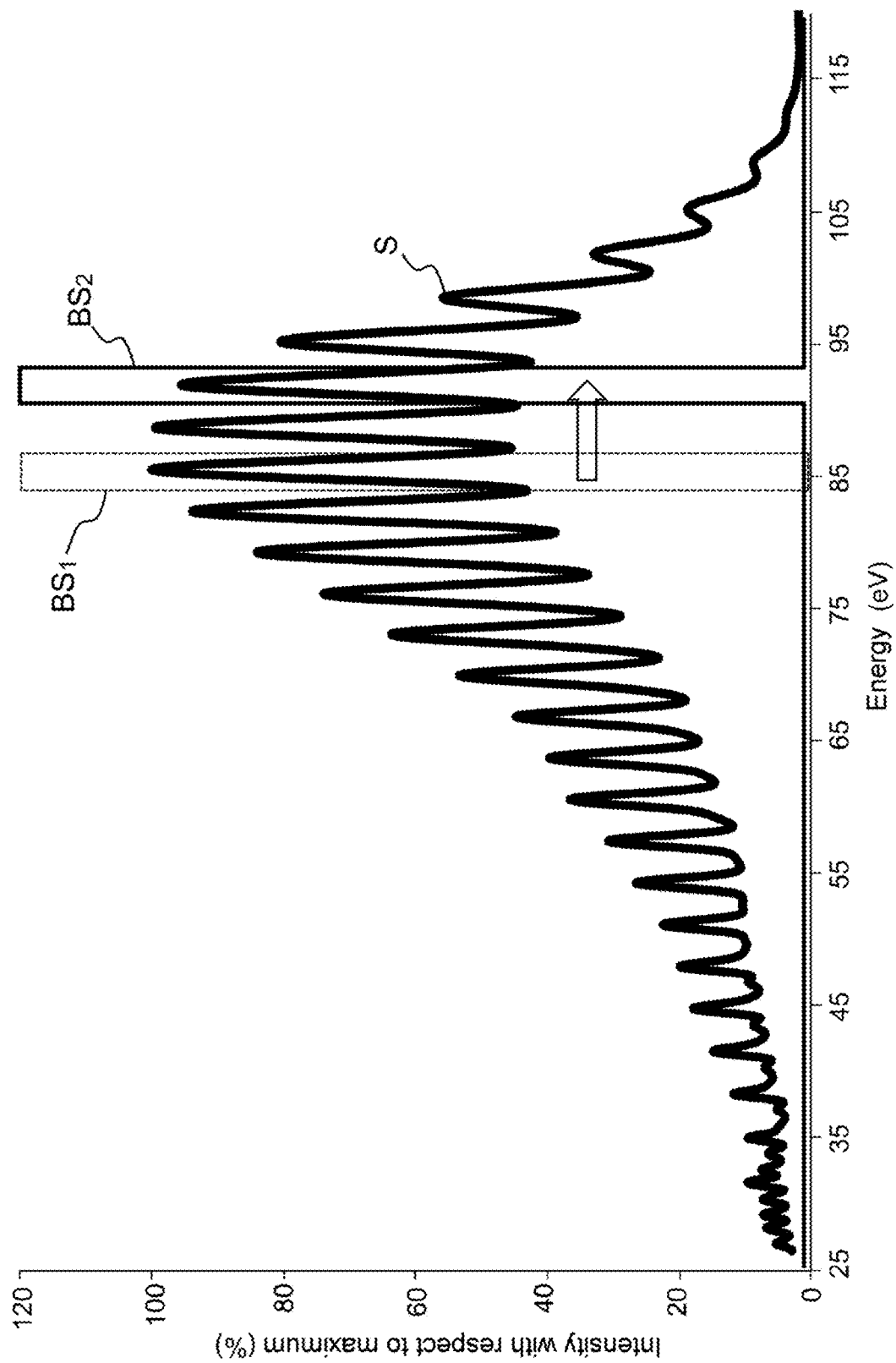
FIG. 6A illustrates an application of a spectral selection component according to the present description to the selection of a harmonic of an HHG source.

For example, as illustrated in FIG. 6A, it is possible, by virtue of the spectral selection component according to the present description, to select one of the lines of the XUV radiation from a high harmonic generation (HHG) source and to change the selected line by varying the angle of incidence on the mirrors without however increasing the spectral width.

Figure 6B:
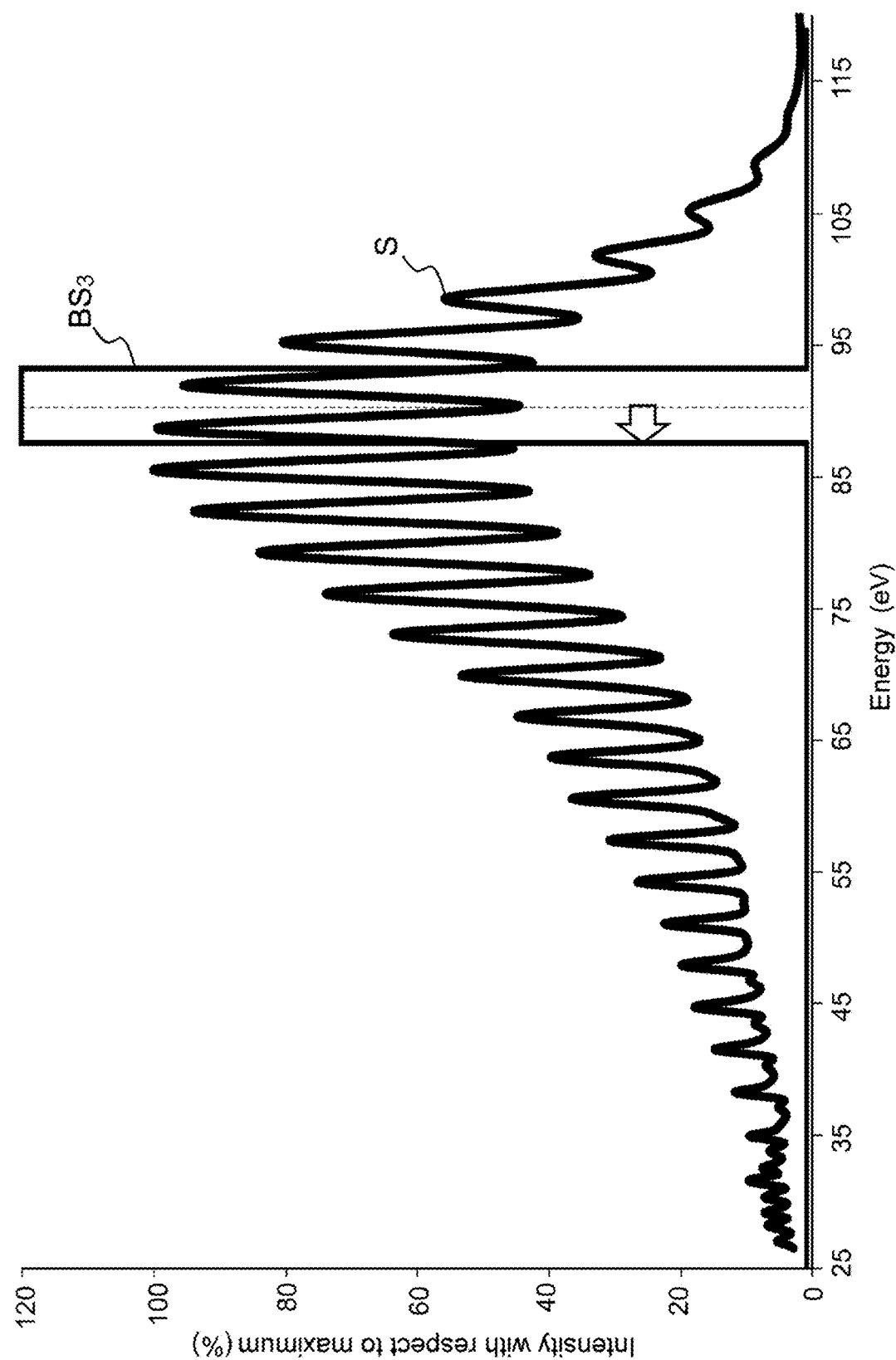
FIG. 6B illustrates an application of a spectral selection component according to the present description to the selection of a plurality of harmonics of an HHG source.

It is also possible, as illustrated in FIG. 6B, to choose the spectral width of the selection and thus to select a plurality of harmonics, or more generally a wider spectral range, which allows a temporally shorter pulse to be transmitted. It is thus possible to test ultrashort processes by choosing the test duration appropriately and optimizing this duration for each process being studied.

Figure 7B:
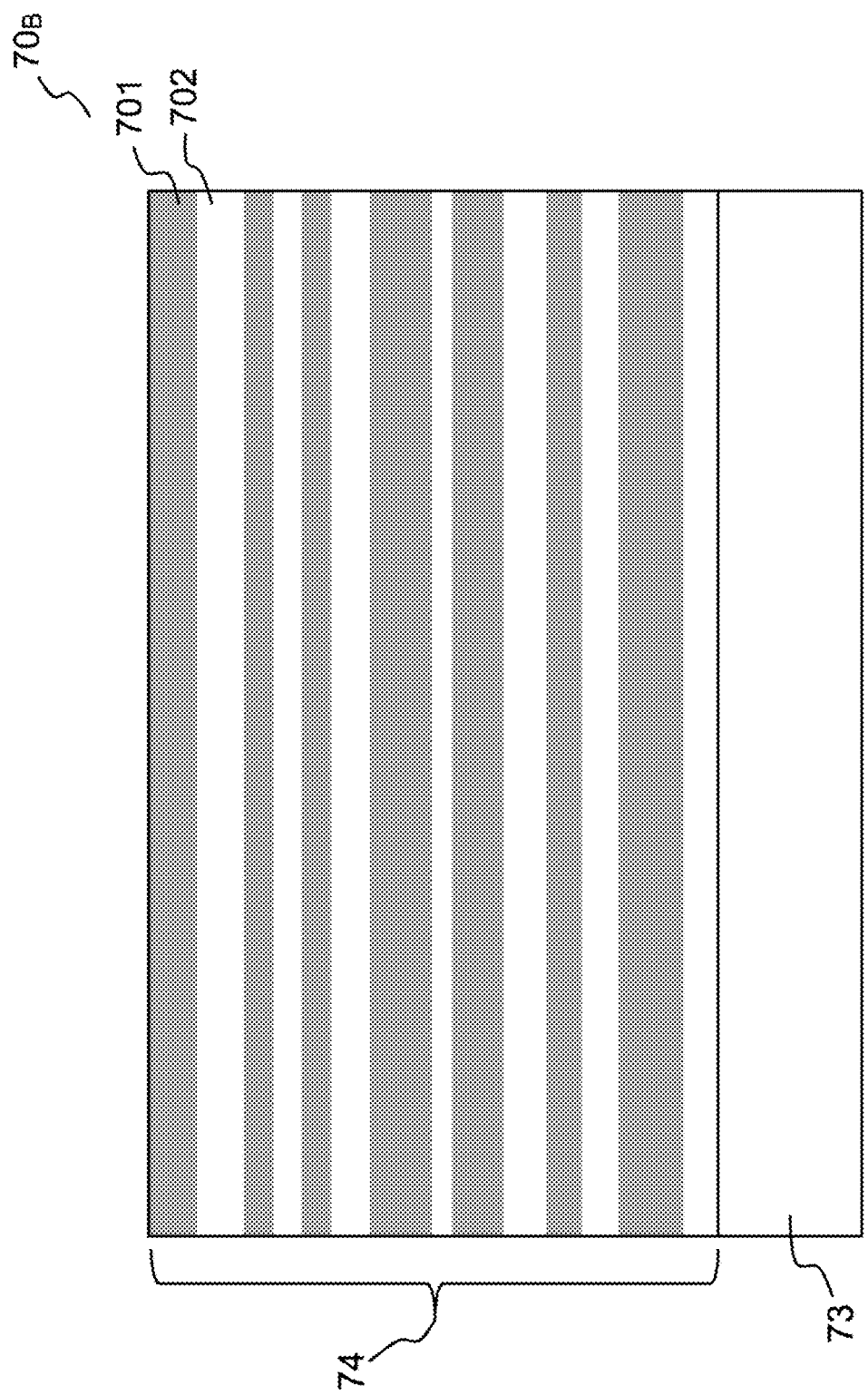

FIGS. 7A and 7B illustrate exemplary biperiodic and aperiodic multilayer mirrors, respectively. The applicants have shown that these mirrors are good candidates for producing a spectral selection component according to the present description.

Biperiodic multilayer mirrors are for example described in J. Gautier et al. ("*Two channel multilayer mirrors for astrophysics*", Optics Communications 281, 3032-3035 (2008)).

Each of the filters may be produced separately using the software IMD (available for free at http://www.rxollc.com/idl/).

As illustrated in FIG. 7A, a biperiodic multilayer mirror $70_A$ comprises, according to one exemplary embodiment, a substrate 73, for example a substrate made of silicon or of silica, and, deposited on the substrate, a first multilayer stack 71, referred to in the present description as the "lower multilayer" and a second multilayer stack 72, referred to in the present description as the "upper multilayer". The first multilayer stack 71 comprises a periodic arrangement, with a first period $d_1$, of layers made of a first material and of layers made of a second material. The second multilayer stack 72 comprises a periodic arrangement, with a second period $d_2$, of layers made of a first material and of layers made of a second material. In the example of FIG. 7A, the first and second materials of the lower and upper multilayers are identical, referenced 701 and 702 in the figure. This makes it possible to model two spectral responses that are very close but slightly offset in terms of energy. It is also possible to use different materials.

One method for designing biperiodic low-pass and high-pass mirrors suitable for producing a spectral selection component according to the present description is for example as follows.

First, the initial thicknesses and materials of the layers are chosen as for a periodic mirror optimized at a given energy.

The choice of materials depends on the desired energy range and those materials allowing the best reflectance in the desired energy range to be obtained should be chosen. Table 1 below gives, by way of example, a few pairs of materials that may be used depending on the desired spectral range:

| λ | materials |
| --- | --- |
| 3 nm < λ < 4.4 nm (282 eV < E < 413 eV) | Cr/Sc |
| 4.4 nm < λ < 6.7 nm (185 eV < E < 282 eV) | W/C, Ni/C, Cr/C, Co/C |
| 6.7 nm < λ < 12.4 nm (100 eV < E < 185 eV) | La/B$_4$C, Mo/B$_4$C, Mo/Y, Mo/Sr, Mo/Be |
| 12.4 nm < λ < 40 nm (31 eV < E < 100 eV) | Mo/Si, Al/Mo/SiC, Al/Zr, Mg/SiC |
| 40 nm < λ < 100 nm (12 eV < E < 31 eV) | Sc/Si, Gd/Si |

With Cr (chromium), Sc (scandium), W (tungsten), C (carbon), Ni (nickel), Co (cobalt), La (lanthanum), B$_4$C (boron carbide), Mo (molybdenum), Y (yttrium), Sr (strontium), Be (beryllium), Si (silicon), SiC (silicon carbide), Gd (gadolinium), Zr (zirconium), Mg (magnesium) and Al (aluminium).

The period in the multilayer arrangement approximately follows Bragg's law:

$$\lambda = 2d \cdot \sin(\theta)$$

where λ is the wavelength of the radiation to be reflected, d is the period of the multilayer and θ is the angle of incidence (with respect to the surface of the mirror). Thus, the periods in the multilayer arrangement are, to within 10%, defined by this formula as a function of the angle of incidence and of the optimization energy/wavelength. The respective thicknesses of the materials in one period are generally chosen such that the most absorbent material occupies between 20% and 50% of the thickness. The exact value of the thicknesses of the materials may be optimized so as to maximize reflectance. These parameters may be chosen so as to be in the center of the tunability range; thus, the optimization energy corresponds to the average energy of the spectral range that has to be covered by the component. For example, θ=45° may be chosen so as to allow a maximum amplitude of angular variation.

Once these parameters have been determined, the shape of the spectrum of the filter, the steepness of the flank and the rejection rate may be obtained by adjusting the period of the upper multilayer stack of the biperiodic mirror and the ratio of the thickness between the various materials (γ) and the number of layers. These adjustments are made for example using the software IMD. The user may run simulations for a plurality of values of the various parameters and then rank the various results in order to select that which appears to be most optimal. The total number of useful layers in the multilayer stack is limited by the absorption of the radiation in the material. Considering that the XUV radiation must reach and return from the last useful layers, the total thickness of the stack corresponding to the average absorption half-length of the multilayer stack should be chosen. This corresponds to a few tens to a few hundreds of layers depending on the thicknesses of the layers and the work energy, which roughly corresponds to a stack ranging from one to a few hundreds of nanometers in thickness. The number of layers in the upper multilayer stack, which ranges from a few to around twenty layers, must be high enough to have an effect on the properties of the mirror without however absorbing too much incident radiation.

Acting on the period of the lower multilayer stack of the biperiodic mirror allows the filter to be positioned in terms of energy. Specifically, the final spectral selection component is composed of two multilayer mirrors, the spectral responses of which partially overlap. Thus, the low-pass (or high-pass) multilayer exhibits maximum reflectance at a slightly lower (or slightly higher) energy than the initial periodic mirror at the design stage. The energy of the response of this initial mirror is advantageously the same as the combined response of the low-pass and high-pass mirrors.

One possible method is then to shift the energies of the spectral responses of the upper and lower multilayer stacks of the biperiodic structure slightly so as to produce an asymmetry in the response of the mirror and to refine the parameters so as to optimize the performance of the filter (steepness of the flank, rejection rate). These optimizations may be made manually, but they may also be made automatically using commercial optimization software such as TFCalc™.

The two, low-pass and high-pass, filters may be produced using the same process.

In addition to these steps, here are some further details if a thickness gradient has to be added. First, the one or more mirrors that will have a thickness gradient (i.e. that will be able to shift their spectral response in terms of wavelength/energy without having to change the angle of incidence as described above) are selected. Next, it is simplest to determine, at a fixed angle, still using the software IMD, by what percentage it is necessary to decrease or increase all of the thicknesses of the one or more multilayer stacks in order to obtain the desired shift in the one or more spectral responses. A few percent (from 5 to 10 at most) is generally sufficient, since the spectral responses must always partially overlap.

Although specific examples have been given in the particular case of biperiodic multilayer mirrors, other types of multiperiodic multilayer mirrors could be used. In this case, the procedure for dimensioning the characteristics of the multilayer mirror follows the same rules as for a biperiodic mirror except that the number of sections is greater than two. For example, there could be a first lower multilayer stack with more layers, the other stacks, which are thinner, being able to be produced using the methodology described above. The upper multilayer stacks may be used to model the shape of the spectral response of the mirror more finely. If the number of stacks becomes significant (beyond just a few), this almost amounts, in the method, to dimensioning a completely aperiodic mirror in which the layers must be dimensioned one at a time using software that does this automatically.

As illustrated in FIG. 7B, an aperiodic multilayer mirror 70B comprises, according to one exemplary embodiment, a substrate 73, for example a substrate made of silicon or of silica, and, deposited on the substrate, a multilayer stack 74 forming an aperiodic alternation of layers of various materials, for example a first material 701 and a second material 702.

An aperiodic multilayer mirror exhibiting the characteristics of a high-pass mirror or of a low-pass mirror suitable for producing a spectral selection component according to the present description may be produced for example by means of software for simulating and optimizing multilayer mirrors, for example commercial software such as TFCalc™.

One advantage of an aperiodic arrangement as illustrated in FIG. 7B may be an improved steepness of the slope and rejection of the mirrors, even if the design and production are more difficult than in the case of biperiodic mirrors for example.

According to one exemplary embodiment, a biperiodic structure designed for example according to the method described above could be used as starting point. Then, by means of the simulation software, the optimization parameters could be adjusted so as to improve for example the slope, i.e. the variation in reflectance between the half-height of the maximum reflectance and the minimum could be made to take place in the narrowest spectral band possible. This may be achieved by positioning "targets" along the slope. The optimization process by the software takes place by minimizing a figure of merit around the targets defined by the user at a given energy and angle of incidence. Each target is also associated with a target reflectance in the context of the optimization process.

The aperiodic multilayers used by way of example in the context of the present description have around 100 to 120 layers with thicknesses of between 1 and 50 nm. The total thickness of the mirror is advantageously of the order of half of the attenuation length of the radiation in the multilayer stack.

Although described by way of a certain number of exemplary embodiments, the spectral selection component and the method for producing this component comprise different variants, modifications and refinements which will become clearly apparent to a person skilled in the art, it being understood that these different variants, modifications and refinements come within the scope of the invention such as defined by the claims below.

The invention claimed is:

1. A spectral selection component for extreme ultraviolet radiation (XUV), comprising:
    a first multilayer mirror being an input mirror for receiving an XUV radiation beam along an input axis located in a first plane of incidence and comprising a first axis of rotation that is substantially perpendicular to the first plane of incidence; and
    a second multilayer mirror being an output mirror for receiving, in a second plane of incidence, an XUV radiation beam reflected by the first multilayer mirror in order to transmit radiation to an output axis of the spectral selection component, and comprising a second axis of rotation that is substantially perpendicular to the second plane of incidence;
    wherein:
        one of the first multilayer mirror and the second multilayer mirror has a first, high-pass energy spectral response in the XUV, corresponding to a reflectivity as a function of energy, with a flank on a low-energy side with a slope in absolute value that is greater than 0.1 eV$^{-1}$ and less than infinity;
        the other of the first multilayer mirror and the second multilayer mirror has a second, low-pass energy spectral response in the XUV, corresponding to a reflectivity as a function of energy, with a flank on a high-energy side with a slope in absolute value that is greater than 0.1 eV$^{-1}$ and less than infinity;

the first, high-pass energy spectral response and the second, low-pass energy spectral response present an energy E0 corresponding to a maximum reflectivity Rmax, the first, high-pass energy spectral response presents an energy E1 corresponding to a reflectivity equal to Rmax/2 and an energy E2 corresponding to a reflectivity equal to Rmax/25, on the low-energy side, the slope being defined between a reflectivity of Rmax/2 and a reflectivity of Rmax/25 on the low-energy side;

the second, low-pass energy spectral response presents an energy E1 corresponding to a reflectivity of Rmax/2 and an energy E2 corresponding to a reflectivity equal to Rmax/25, on the high-energy side, the slope being defined between a reflectivity of Rmax/2 and a reflectivity of Rmax/25 on the high-energy side; and the first multilayer mirror and the second multilayer mirror are configured to have only a partial overlap in respective spectral energy responses.

2. The spectral selection component as claimed in claim 1, wherein the input mirror and the output mirror are multiperiodic multilayer mirrors.

3. The spectral selection component as claimed in claim 1, wherein the input mirror and the output mirror are aperiodic multilayer mirrors.

4. The spectral selection component as claimed in claim 1, wherein the first and second planes of incidence are coincident.

5. The spectral selection component as claimed in claim 1, wherein a rotation of the first multilayer mirror and a rotation of the second multilayer mirror are coupled about the first and second axes of rotation, respectively, allowing the output axis to be kept parallel to the input axis.

6. The spectral selection component as claimed in claim 5, wherein one and/or the other of the first multilayer mirror and the second multilayer mirror is translated along an axis that is substantially parallel to the input axis, allowing the output axis to be kept fixed when the first multilayer mirror and the second multilayer mirror are rotated.

7. The spectral selection component as claimed in claim 1, wherein:

at least one of the first multilayer mirror and the second multilayer mirror has a lateral thickness gradient in a direction that is substantially perpendicular to the first plane of incidence of the first multilayer mirror;

the first multilayer mirror being translated in the direction of the lateral thickness gradient.

8. A system for emitting a variable-energy XUV radiation beam, comprising an XUV radiation source for emitting an XUV radiation beam in a given direction and a spectral selection component as claimed in claim 1, for receiving the variable-energy XUV radiation beam along its input axis.

9. A method for spectrally selecting an extreme ultraviolet radiation (XUV) beam having a wide spectral band, comprising:

reflecting, by a first multilayer mirror, the XUV radiation beam along an input axis located in a first plane of incidence;

reflecting, by a second multilayer mirror the XUV radiation beam reflected by the first multilayer mirror toward an output axis, the beam reflected by the second multilayer mirror and the output axis being located in a second plane of incidence; and rotating the first multilayer mirror about a first axis of rotation that is substantially perpendicular to the first plane of incidence and the second multilayer mirror about a second axis of rotation that is substantially perpendicular to the second plane of incidence in order to change an energy of an output XUV radiation beam;

wherein:

one of the first multilayer mirror and the second multilayer mirror has a first, high-pass energy spectral response in the XUV, corresponding to a reflectivity as a function of energy, with a flank on a low-energy side with a slope in absolute value that is greater than $0.1$ $eV^{-1}$ and less than infinity;

the other of the first multilayer mirror and the second multilayer mirror has a second, low-pass energy spectral response in the XUV, corresponding to a reflectivity as a function of energy, with a flank on a high-energy side with a slope in absolute value that is greater than $0.1$ $eV^{-1}$ and less than infinity;

the first, high-pass energy spectral response and the second low-pass energy spectral response present an energy E0 corresponding to a maximum reflectivity Rmax;

the first, high-pass energy spectral response presents an energy E1 corresponding to a reflectivity of Rmax/2 and an energy E2 corresponding to a reflectivity equal to Rmax/25, on the low-energy side, the slope being defined between a reflectivity of Rmax/2 and a reflectivity of Rmax/25 on the low-energy side;

the second, low-pass energy spectral response presents an energy E1 corresponding to a reflectivity of Rmax/2 and an energy E2 corresponding to a reflectivity equal to Rmax/25, on the high-energy side, the slope being defined between a reflectivity of Rmax/2 and a reflectivity of Rmax/25 on the high energy side; and the first multilayer mirror and the second multilayer mirror have only a partial overlap in respective spectral energy responses.

10. The method for spectrally selecting an extreme ultraviolet radiation (XUV) beam having a wide spectral band as claimed in claim 9, wherein rotations of the first multilayer mirror and the second multilayer mirror are coupled, allowing the output axis to be kept parallel to the input axis.

11. The method for spectrally selecting an extreme ultraviolet radiation (XUV) beam having a wide spectral band as claimed in claim 9, further comprising translating one and/or the other of the first multilayer mirror and the second multilayer mirror along an axis that is substantially parallel to the input axis, allowing the output axis to be kept fixed when the first multilayer mirror and the second multilayer mirror are rotated.

12. The method for spectrally selecting an extreme ultraviolet radiation (XUV) beam having a wide spectral band as claimed in claim 9, wherein:

at least one of the first multilayer mirror and the second multilayer mirror has a lateral thickness gradient in a direction that is substantially perpendicular to the first plane of incidence of the first multilayer mirror;

the method further comprising translating the first multilayer mirror in the direction of the lateral thickness gradient in order to modify a spectral width of the output XUV radiation beam.

* * * * *